United States Patent
Liu et al.

(10) Patent No.: US 12,354,284 B2
(45) Date of Patent: Jul. 8, 2025

(54) METHOD, APPARATUS AND SYSTEM FOR ADAPTATING A MACHINE LEARNING MODEL FOR OPTICAL FLOW MAP PREDICTION

(71) Applicant: HUAWEI TECHNOLOGIES CO., LTD., Shenzhen (CN)

(72) Inventors: Wentao Liu, Maple (CA); Seyed Mehdi Ayyoubzadeh, Hamilton (CA); Yuanhao Yu, Markham (CA); Irina Kezele, North York (CA); Yang Wang, Winnipag (CA); Xiaolin Wu, Ancaster (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 791 days.

(21) Appl. No.: 17/524,480

(22) Filed: Nov. 11, 2021

(65) Prior Publication Data
US 2023/0148384 A1    May 11, 2023

(51) Int. Cl.
*G06T 7/246*    (2017.01)
*G06N 20/00*    (2019.01)

(52) U.S. Cl.
CPC ............ *G06T 7/248* (2017.01); *G06N 20/00* (2019.01); *G06T 2207/10016* (2013.01); *G06T 2207/20081* (2013.01)

(58) Field of Classification Search
CPC .... G06N 20/00; G06N 3/0495; G06N 3/0464; G06N 3/09; G06N 3/0455; G06T 7/269; G06T 7/248; G06T 2207/20084; G06T 2207/20081; G06T 2207/10016
See application file for complete search history.

(56) References Cited

U.S. PATENT DOCUMENTS

2021/0004969 A1*  1/2021  Pourian .................. G06T 7/223

OTHER PUBLICATIONS

Hu, Hezhen, et al. "MV2Flow: Learning motion representation for fast compressed video action recognition." ACM Transactions on Multimedia Computing, Communications, and Applications (TOMM) 16.3s (2020): 1-19. (Year: 2020).*
"SelFlow: Self-Supervised Learning of Optical Flow", Pengpeng Liu et al., IEEE Conference on Computer Vision and Pattern Recognition, 2019.
"DMC-Net: Generating Discriminative Motion Cues for Fast Compressed Video Action Recognition", Zheng Shou et al., IEEE Conference on Computer Vision and Pattern Recognition, 2020.
(Continued)

*Primary Examiner* — Vu Le
*Assistant Examiner* — Tracy Mangialaschi

(57) ABSTRACT

There is provided a method, apparatus and system for adapting a machine learning model for optical flow prediction. A machine learning model can be trained or adapted based on compressed video data, using motion vector information extracted from the compressed video data as ground-truth information for use in adapting the model to a motion vector prediction task. The model so adapted can accordingly be adapted for the similar task of optical flow prediction. Thus, the model can be adapted at test time to image data which is taken from an appropriate distribution. A meta-learning process can be performed prior to such model adaptation to potentially improve the model's performance.

12 Claims, 13 Drawing Sheets

(56) References Cited

OTHER PUBLICATIONS

"Fast Optical Flow Extraction From Compressed Video", Sean I. Young et al., IEEE Transactions on Image Processing. vol. 29, 2020.
"Flownet: Learning optical flow with convolutional networks", Dosovitskiy, P. et al., In Proceedings of the IEEE international conference on computer vision, pp. 2758-2766, 2015.
"Test-Time Fast Adaptation for Dynamic Scene Deblurring via Meta-Auxiliary Learning", Z. Chi, et al., In Proceedings of the IEEE/CVF Conference on Computer Vision and Pattern Recognition, pp. 9137-9146. 2021.
"Test-time training with self-supervision for generalization under distribution shifts", Y. Sun et al., In International Conference on Machine Learning, pp. 9229-9248, PMLR, 2020.
"Test-Time Personalization with a Transformer for Human Pose Estimation", M. Hao, et al., 35th Conference on Neural Information Processing Systems, 2021.
"Tent: Fully test-time adaptation by entropy minimization", Wang, Dequan, et al., published as a conference paper at ICLR, 2021.
"Model-agnostic meta-learning for fast adaptation of deep networks", Finn, P. et al., International Conference on Machine Learning, pp. 1126-1135, PMLR, 2017.
"Advanced video coding for generic audiovisual services", Series H: Audiovisual and Multimedia Systems, Infrastructure of audiovisual services—Coding of moving video, ITU-T Recommendation H.264., 2021.
"High efficiency video coding", Series H: Audiovisual and Multimedia Systems, Infrastructure of audiovisual services—Coding of moving video, ITU-T, ITU-T Recommendation H.265., 2021.

\* cited by examiner

METHOD, APPARATUS AND SYSTEM FOR ADAPTATING A MACHINE LEARNING MODEL FOR OPTICAL FLOW MAP PREDICTION

CROSS-REFERENCE TO RELATED APPLICATIONS

This is the first application filed for the present disclosure.

FIELD OF THE DISCLOSURE

The present disclosure pertains to the field of digital image processing and in particular to a method, apparatus and system for configuring a machine learning model for use in estimating optical flow maps for digital image data.

BACKGROUND

In the field of image processing, optical flow (OF) is often defined as the distribution of apparent velocities of movement of brightness pattern in an image, which arise from the relative motion between the visual stimulus and the observer. Since optical flow provides a comprehensive description of object motions, it finds a wide range of applications in many tasks, such as motion detection, action recognition, object tracking etc. As a result, optical flow estimation (OFE) has become an important task for video image processing.

OFE is often performed to estimate the motion between two consecutive image frames in a video. Given two images $I^1$ and $I^2$ of size H×W×3, (where H and W represent the height and width of the image, e.g. in pixels, and there are three channels for image data, e.g. corresponding to three primary colors), the OF map F is defined as the relative displacements of corresponding pixels from $I^1$ to $I^2$ in the image plane, and has a size of H×W×2, where the first and second channels indicate the horizontal and vertical displacements, respectively. Traditionally, the OF map F is estimated by leveraging the brightness constancy constraint with some additional smoothness prior. However, this approach suffers from slow iterative algorithms and frequent violation of brightness constancy constraint.

This background information is provided to reveal information believed by the applicant to be of possible relevance to the present disclosure. No admission is necessarily intended, nor should be construed, that any of the preceding information constitutes prior art against the present disclosure.

SUMMARY

The present disclosure provides a method, apparatus and system for configuring (e.g. training or adapting) a machine learning model for use in estimating (predicting) optical flow maps.

In accordance with embodiments of the present disclosure, there is provided a method for adapting a machine learning model for optical flow map prediction. The method can be performed by a computer or other electronic device. The method includes obtaining image data describing a pair of image frames from a video stream. The method includes generating, using the machine learning model, a prediction of a motion vector map for the image data. The motion vector map is indicative of motion indicated by the pair of image frames. The method includes obtaining, from information encoded into the video stream, a previously generated version of the motion vector map for the image data. The previously generated version of the motion vector map is provided as part of the video stream in accordance with a video compression scheme used on the video stream. The method includes updating parameters of the machine learning model based at least in part on a comparison between the prediction of the motion vector map and the previously generated version of the motion vector map. The machine learning model is used directly or indirectly in both the generating of the prediction of the motion vector map and generating of a prediction of an optical flow map, the optical flow map indicative of a pattern of apparent motion indicated by sequential image frames in the video stream.

In accordance with embodiments of the present disclosure, there is provided an apparatus (e.g. an electronic device). The apparatus includes one or more processing components, such as a processor operatively coupled to memory, or other electronic or photonic components configured to perform computation operations. The apparatus includes a machine learning model component, a motion vector loss function, and a machine learning model manager, each of which are implemented at least in part by the processing components. The apparatus is configured to obtain, by the machine learning model component, image data describing a pair of image frames from a video stream. The apparatus is configured to generate, using the machine learning model component, a prediction of a motion vector map for the image data. The motion vector map is indicative of motion indicated by the pair of image frames. The apparatus is configured to obtain, by the motion vector loss function, from information encoded into the video stream, a previously generated version of the motion vector map for the image data. The previously generated version of the motion vector map is provided as part of the video stream in accordance with a video compression scheme used on the video stream. The apparatus is configured to update, by the machine learning model manager, parameters of the machine learning model based at least in part on a comparison between the prediction of the motion vector map and the previously generated version of the motion vector map. The machine learning model is used directly or indirectly in both the generating of the prediction of the motion vector map and generating of a prediction of an optical flow map, the optical flow map indicative of a pattern of apparent motion indicated by sequential image frames in the video stream.

In various embodiments, the machine learning model is a multi-level machine learning model, and the embodiments further include: generating, using a plurality of interdependent levels of the multi-level machine learning model, a plurality of respective predictions of the motion vector map for the image data; and updating machine learning model parameters within some or all of the plurality of levels based at least in part on one or more comparisons. Each of the one or more comparisons is between a respective one of the plurality of predictions of the motion vector map and the previously generated version of the motion vector map.

In various embodiments, embodiments further include generating, using the machine learning model, the prediction of the optical flow map for the image data or for further image data. In various embodiments, the machine learning model comprises a backbone portion configured to generate a feature map based upon which both the prediction of the optical flow map and the prediction of the motion vector map are generated. In such embodiments, updating parameters of the machine learning model is based at least in part on a comparison between the prediction of the motion vector map and the previously generated version of the motion vector map comprises updating parameters of the backbone portion.

In various embodiments, the machine learning model comprises: an optical flow map estimation portion configured to generate the prediction of the optical flow map; and a conversion portion configured to generate the prediction of the motion vector map based on the prediction of the optical flow map as output by the optical flow map estimation portion. In such embodiments, updating parameters the machine learning model comprises updating parameters of the optical flow map estimation portion.

In various embodiments, the above adapting operations are performed after a prior training phase. In various further embodiments, the prior training phase includes training the machine learning model using a meta-learning process. The meta-learning process includes iteratively updating parameters of the machine learning model based on comparisons of: motion vector map predictions with ground-truth motion vector maps; and optical flow map predictions with ground-truth optical flow maps. In yet further embodiments, updating the parameters of the machine learning model comprises one or more of a first, second and third gradient descent operation. The first gradient descent operation is for updating parameters of one or more backbone portions of the machine learning model, the backbone portions each configured to generate a respective feature map. The second gradient descent operation is for updating parameters of one or more motion vector map prediction portions of the machine learning model, the motion vector map prediction portions each configured to generate a respective motion vector map prediction based at least in part on one or more of the feature maps. The third gradient descent operation is for updating parameters of one or more optical flow map prediction portions of the machine learning model, the optical flow map prediction portions each configured to generate a respective optical map prediction based at least in part on one or more of the feature maps.

In some embodiments, the comparison of motion vector map predictions with ground-truth motion vector maps is encoded as a first loss $L_M$, and the comparison of optical flow map predictions with ground-truth optical flow maps is encoded as a second loss $L_F$. Further, in such embodiments at least one of the first set of parameters, the second set of parameters and the third set of parameters is updated based at least in part on one or more computed gradients with respect to the first loss $L_M$. Further, in at least some such embodiments, at least one of the first set of parameters, the second set of parameters and the third set of parameters may be updated based at least in part on one or more computed gradients with respect to the second loss $L_F$.

In some further embodiments, the comparison of motion vector map predictions with ground-truth motion vector maps is encoded as a first loss $L_M$, and the comparison of optical flow map predictions with ground-truth optical flow maps is encoded as a second loss $L_F$. Further, in such embodiments, for each of one or more training samples, a set of operations is performed. The set of operations includes: (1) setting a first set of placeholder parameters $\hat{\theta}_s^B$ to be equal to the first set of parameters $\theta^B$; setting a second set of placeholder parameters $\hat{\theta}_s^F$ to be equal to the second set of parameters $\theta^F$; (2) repeatedly performing for a predetermined number K of iterations: (2a) evaluating the first loss $L_M$; (2b) updating the first set of placeholder parameters according to a gradient descent update step involving a gradient $$\nabla_{\hat{\theta}_s^B} L_M$$

of the first loss $L_M$ with respect to the first set of placeholder parameters; (2c) updating the second set of parameters according to another gradient descent update step involving a gradient $\nabla_{\theta^M} L_M$ of the first loss $L_M$ with respect to the third set of parameters $\theta^M$; following said K iterations: (3) evaluating the second loss value $L_F$; and (4) computing a first gradient $$\nabla_{\hat{\theta}_s^B} L_F$$

for the training sample and a second gradient $$\nabla_{\hat{\theta}_s^F} L_F$$

for the training sample. The first gradient is a gradient of the total optical flow loss value with respect to the first set of placeholder parameters, and the second gradient is a gradient of the total optical flow loss with respect to the second set of placeholder parameters. In some further embodiments, after performing the set of operations for all of the training samples: the first set of parameters $\theta^B$ is (5a) updated according to a first overall gradient descent update step involving a sum, over all of the training samples, of the first gradients; and the third set of parameters $\theta^F$ is updated (5b) according to a second overall gradient descent update step involving a sum, over all of the training samples, of the second gradients.

Embodiments of the present disclosure may resolve the robustness problems of existing DNN-based OFE models by using a particular training and an inference pipeline, for example involving the use of MV (i.e. motion vector) map data obtained from compressed video streams to facilitate adaptation of a particularly configured DNN-based OFE model.

For purposes of exposition, embodiments of the present disclosure are described as being further developments of a multi-level network DNN architecture for example as illustrated in FIG. 2. However, it should be understood that the present disclosure is not necessarily limited to such embodiments.

Embodiments of the present disclosure utilize the TTA technique by incorporating a self-supervised task for improving the generalization of existing OFE models to test data sampled from an unknown or arbitrary distribution.

Embodiments of the present disclosure provide for an adaptation task in which OFE is performed on data drawn from a new distribution. By employing the MAML framework, embodiments can potentially improve the prediction accuracy by seeing only one or a limited number of test samples and updating the model for a small number of steps.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present disclosure provides a method, apparatus and system for configuring a machine learning model for use in estimating optical flow maps, i.e. performing OFE.

Figure 1A:
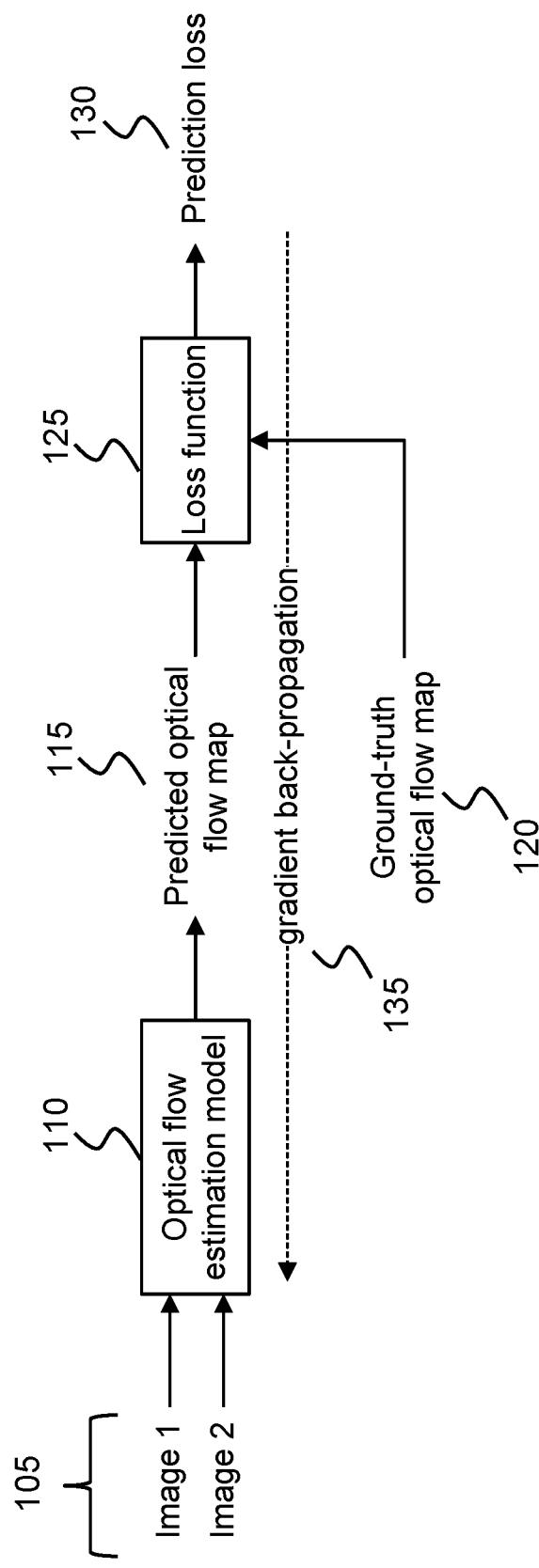
FIG. 1A illustrates an optical flow estimation machine learning model in accordance with the prior art.
Figure 1B:
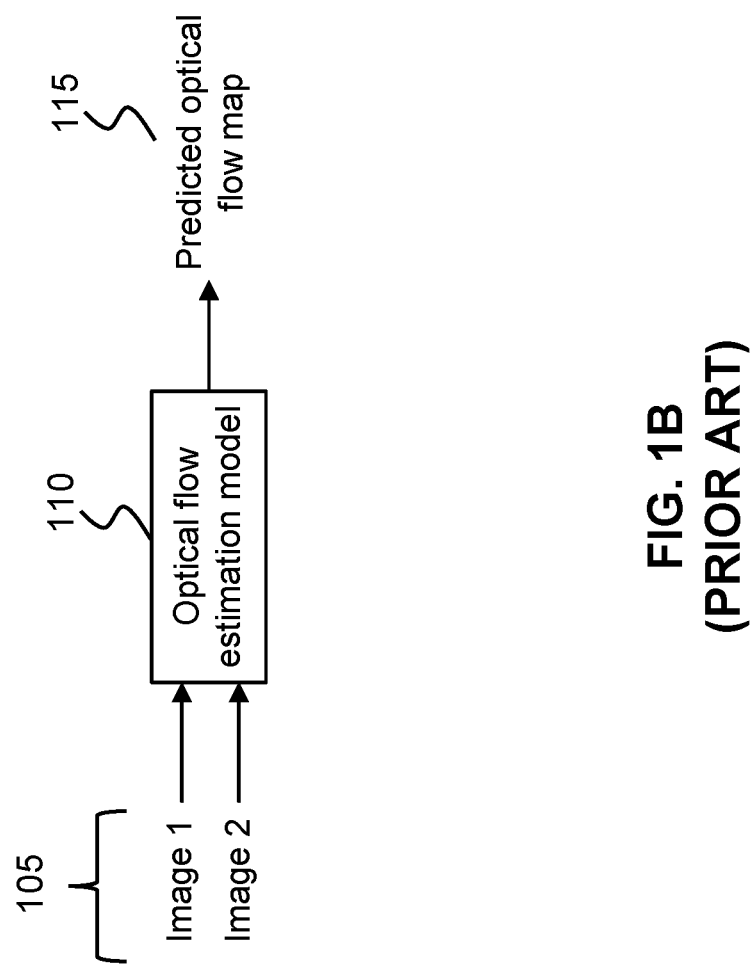
FIG. 1B illustrates operation of the optical flow estimation model of FIG. 1A in an inference mode.

One way of addressing the problem of estimating OFE maps assumes that there exists a function g parametrized by $\theta$ that can map any image pair, $\{I^1, I^2\}$, to its corresponding OF map F. The parameters $\theta$ can then be determined using a large annotated database of image data. In recent years, the estimator $g(.,.;\theta)$ is normally implemented by a deep neural network (DNN) with $\theta$ being its weights. This approach has been somewhat successful due to the DNN's strong function approximation capability and end-to-end trainable properties. The training and inference process of a DNN-based OF model is illustrated in FIGS. 1A and 1B. The DNN model is first trained with ground-truth OF annotations in an end-to-end manner using a well-known gradient back-propagation technique, while during inference, the learned estimator performs feed forward computation.

In more detail, FIG. 1A illustrates an optical flow estimation model 110 which operates on pairs of images 105 to generate a predicted (estimated) OF map 115. Assuming a known ground-truth OF map 120 for the pair of images is available, the predicted OF map and the ground-truth OF map can be compared using a loss function 125. The loss function outputs a prediction loss value 130 which increases with the differences between the predicted OF map and the ground-truth OF map. A gradient back-propagation operation 135 can then be performed based on this prediction loss value, in order to adjust parameters of the optical flow estimation model. FIG. 1B illustrates operation of the optical flow estimation model in an inference mode, after a sufficient number of parameter adjustments based on training data is complete. In this mode, the now-trained optical flow estimation model 110 generates predicted OF maps 115 based on further input pairs of images 105.

The supervised training approach of FIG. 1A relies significantly on the availability of a large-scale dataset with ground-truth OF maps, which are difficult to obtain for natural videos. Approaches have been proposed to mitigate this problem by creating a large-scale synthetic database, whose ground-truth OF maps can be derived from the synthesizing process, and then training the OFE model using the synthetic samples. However, this approach can cause robustness challenges after the model trained in this manner is deployed to real-world scenarios. This is because the data distribution during test or real-world operation can be substantially different from the data distribution (from the synthetic data) which is used during supervised training. One approach to resolve this issue is to further fine-tune the model using a limited number of labeled samples drawn from the test-time data distribution. However, this approach has three limitations. First, it is often difficult or ambiguous to validate whether the fine-tuning dataset has a similar distribution to the real application scenario. Second, it is expensive and time-consuming to collect and annotate training data for each application scenario. Third, the data distribution in the application scenario will also drift with time.

Since the proposal of FlowNet (A. Dosovitskiy, P. Fischer, E. Ilg, P. Hausser, C. Hazirbas, V. Golkov, P. Van der Smagt, D. Cremers, and T. Brox. "Flownet: Learning optical flow with convolutional networks," In Proceedings of the IEEE international conference on computer vision, pp. 2758-2766. 2015), several DNN-based OFE models have followed a similar network architecture as summarized in FIG. 2. Specifically, these models employ a multi-level design, in which each level of an OFE model operates not only on the input image pair 205 but also on the OF map prediction result and some intermediate features from the OFE model of the previous level to generate a refined OF map prediction. This design is inspired by the idea of gradually refining the predicted OF map which is widely used in traditional OFE methods. In more detail, the multi-level OFE model includes N OFE models 210a to 210n which generate respective OF map predictions 215a to 215n. Output of each OFE model is provided as input to the next-level OFE model. Each OF map prediction can be compared to a ground-truth OF map 220 for the image pair 205 via an OF loss function 225, and the resulting losses can be summed to obtain a total loss 230. Gradient back-propagation (not shown) can proceed based on the total loss in order to adjust OFE model parameters.

Figure 2:
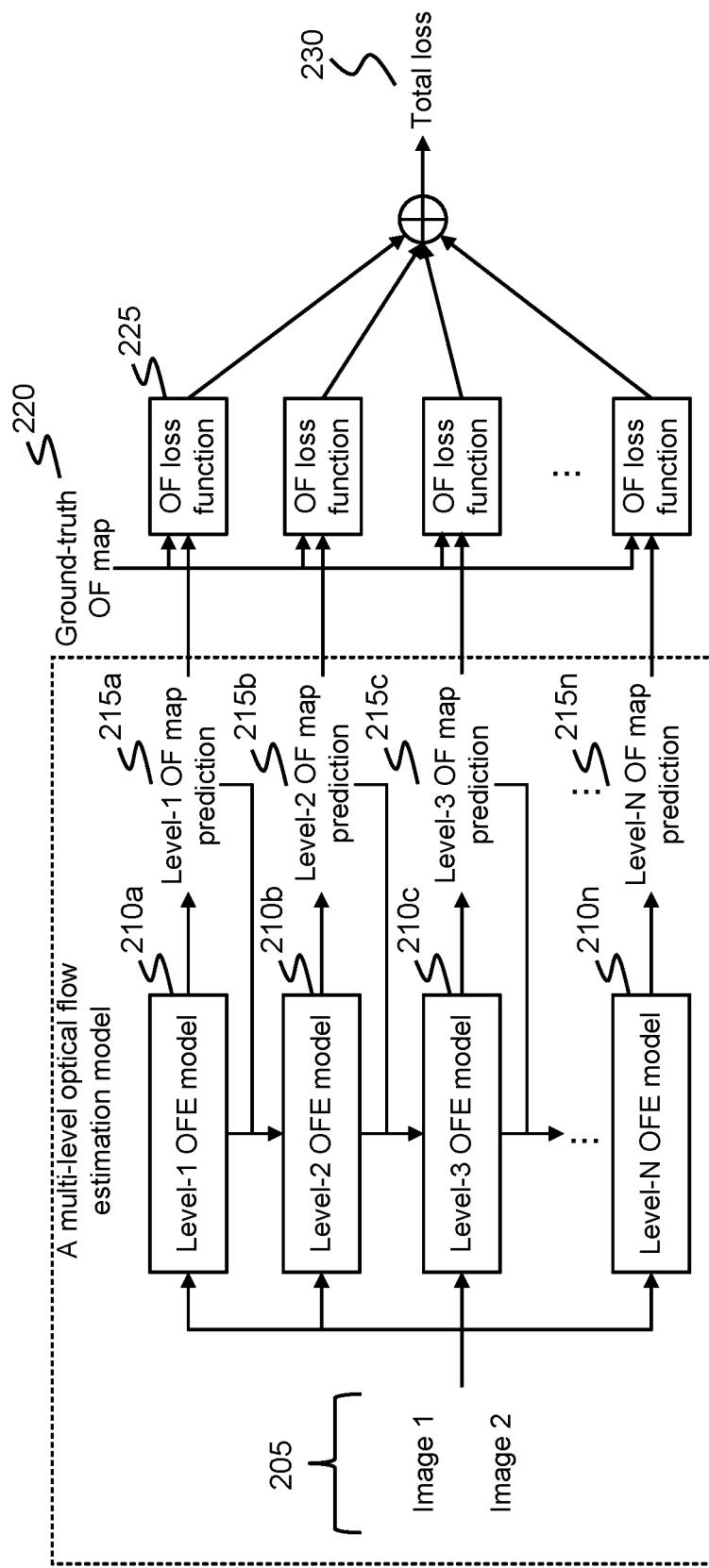
FIG. 2 illustrates another optical flow estimation machine learning model in accordance with the prior art.
Figure 3:
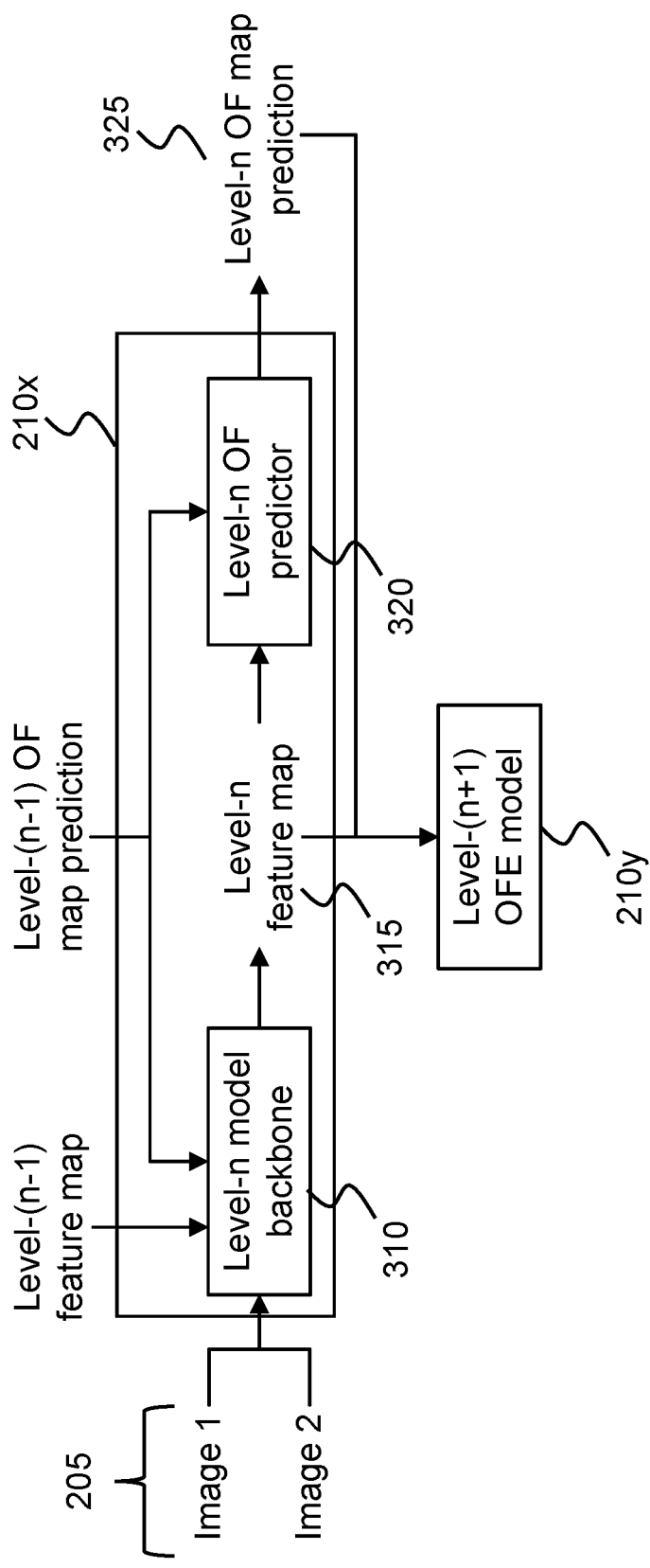
FIG. 3 illustrates portion of the optical flow estimation machine learning model of FIG. 2, in accordance with the prior art.

FIG. 3 illustrates in more detail a level-n OFE model (one of 210a to 210n, here 210x) of FIG. 2. The level-n OFE model consists of two modules: a model backbone 310 configured to extract a motion feature map 315 and an OF predictor 320 configured to determine an OF map prediction 325 based in part on contents of the motion feature map 315. In addition, the extracted motion feature map 315 and the OF map prediction 325 are used as input for the next level OFE model 210y. It is worth mentioning the training strategy of these multi-level OFE models. Since each level can generate an OF map prediction, a loss between the prediction and the ground-truth can be calculated for each level. A total loss is thus obtained as the weighted sum of the loss of each level as shown in FIG. 2. Then the normal gradient backpropagation technique is used to train the whole multi-level model in an end-to-end manner.

Recently, the test-time adaptation (TTA) technique has drawn growing attention in the machine learning community to enhance the generalization of DNN models to out-of-distribution test data. TTA is described for example in Z. Chi, Y. Wang, Y. Yu, and J. Tang. "Test-Time Fast Adaptation for Dynamic Scene Deblurring via Meta-Auxiliary Learning," In Proceedings of the IEEE/CVF Conference on Computer Vision and Pattern Recognition, pp. 9137-9146. 2021; Y. Sun, X. Wang, Z. Liu, J. Miller, A. Efros, and M. Hardt. "Test-time training with self-supervision for generalization under distribution shifts," In International Conference on Machine Learning, pp. 9229-9248. PMLR, 2020; M. Hao, Y. Li, Z. Di, N. B. Gundavarapu, and X. Wang. "Test-Time Personalization with a Transformer for Human Pose Estimation," arXiv preprint arXiv:2107.02133 (2021); and Wang, Dequan, Evan Shelhamer, Shaoteng Liu, Bruno Olshausen, and Trevor Darrell, "Tent: Fully test-time adaptation by entropy minimization," arXiv preprint arXiv: 2006.10726 (2020). A main idea of TTA is to adapt the model to fit the test data distribution during test time. However, because the labels for test data are unavailable at test time, it is not always straightforward to implement. Indeed, prior to the present disclosure, there does not appear to be a realistic TTA approach available for the OFE task.

Model-agnostic meta learning (MAML), for example as described in C. Finn, P. Abbeel, and S. Levine. "Model-agnostic meta-learning for fast adaptation of deep networks," in *International Conference on Machine Learning*, pp. 1126-1135. PMLR, 2017, provides a general framework for any DNN models to quickly adapt to a new task. However, to date the MAML framework also does not appear to have been implemented for the OFE task.

OFE models are often used for extracting motion representations in videos, which are often saved in some compressed formats. Common video stream formats such as H.264 and HEVC are examples of such compressed formats. H.264 and HEVC refer to two commonly-used video coding standards. The currently enforced H.264 standard is specified in ITU-T, "Advanced video coding for generic audio-visual services." *ITU-T Recommendation H.264.* (2021). The currently enforced HEVC standard is specified in ITU-T, "High efficiency video coding." *ITU-T Recommendation H.265.* (2021). Compression may be carried out primarily for the purpose of efficient usage of storage and bandwidth. As will be shown, it is recognized herein that some data encoded in video streams can provide appropriate labels for self-supervised learning and thus test-time adaptation, for OFE machine learning models.

Modern video encoders often exploit the redundancy between adjacent frames of a video to achieve high compression ratio. Denote by $I^1 \in \mathbb{R}^{H \times W \times 3}$ and $I^2 \in \mathbb{R}^{H \times W \times 3}$ the current and the next frames of a video, respectively. A video encoder may essentially estimate a motion vector (MV) map $M \in \mathbb{R}^{H \times W \times 2}$ and a residual map $R \in \mathbb{R}^{H \times W \times 3}$ so that the pixel value of $I^2$ at any position p can be recovered by $I^2(p)=I^1(p+M(p))+R(p)$. In order to achieve desired coding efficiency, the residual is often required to be as small as possible, which essentially enforces the brightness constancy constraint for MV estimation in video encoding. In fact, it can be shown that, ignoring the block size complication, the MV estimation process is theoretically identical to OFE.

It is recognized herein that the resemblance between MV maps and OF maps and the free availability of MV information in a video stream make MV prediction a potentially useful self-supervised task for test-time adaptation for OFE models. By fine-tuning a (e.g. partially or fully trained) model based on the MV prediction task, embodiments of the present disclosure may improve the prediction accuracy of OFE on the test video, which can be drawn from an unknown or arbitrary distribution.

Embodiments of the present disclosure can be employed to address the test distribution shift issue in the optical flow estimation (OFE) task. This issue, as discussed above, involves the fact that the distribution of samples used in initial training of a machine learning model for OFE can be significantly different than the distribution of samples used at test time or following test, which can lead to performance degradation. In other words, existing DNN-based OFE models are faced with test distribution shift problem and may result in inferior prediction accuracy when deployed to real-world application scenarios where input data may be drawn from an unknown distribution. By providing a means for the machine learning model to adapt to data drawn from an appropriate test distribution, performance can potentially be improved. Moreover, embodiments of the present disclosure may potentially improve the robustness of a deep-neural-network-based (DNN-based) OFE model when it is applied in a new application scenario.

Embodiments of the present disclosure provide for a general approach for DNN-based OFE models to improve their performance on test videos, for example when training data and test data come from different distributions. Various embodiments involve one or more of: a two-headed multi-level network architecture; a self-supervised learning task of motion vector (MV) map prediction, a meta-learning process; and test-time adaptation process. By updating the model parameters towards the test samples before using the model for inference, embodiments of the present disclosure potentially enhance the robustness of the OFE model against distribution shift.

Various aspects of the present disclosure will now be described with particular regard to a first embodiment. These aspects include: a two-headed multi-level model architecture; a self-supervised MV prediction task; a meta-learning process in the machine learning model training phase; and a test-time adaptation process which may be part of the inference phase following training. The two-headed aspect refers to the architecture having two outputs: an OF prediction output and a MV prediction output.

Figure 4:
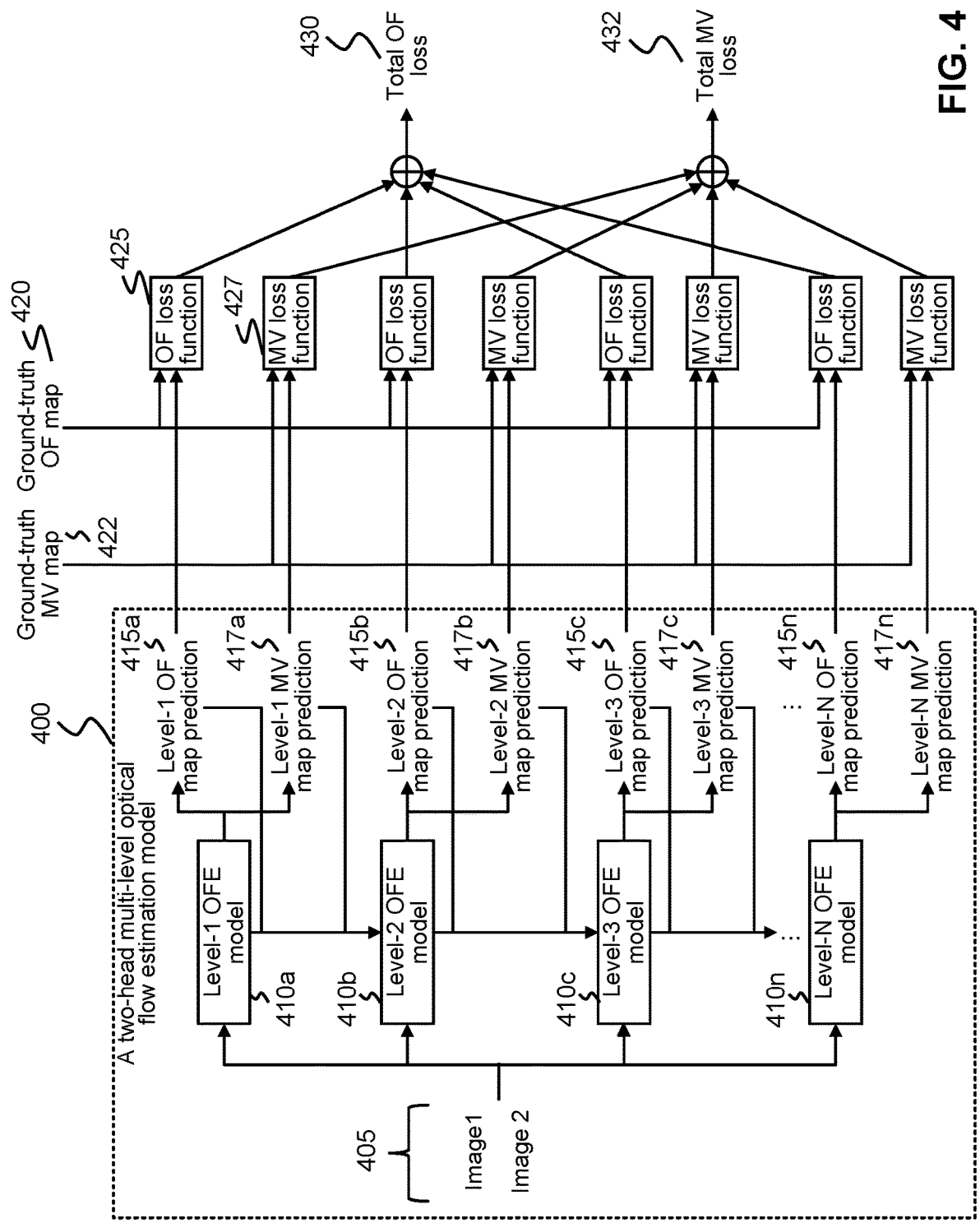
FIG. 4 illustrates an optical flow estimation machine learning model, in accordance with embodiments of the present disclosure.
Figure 5:
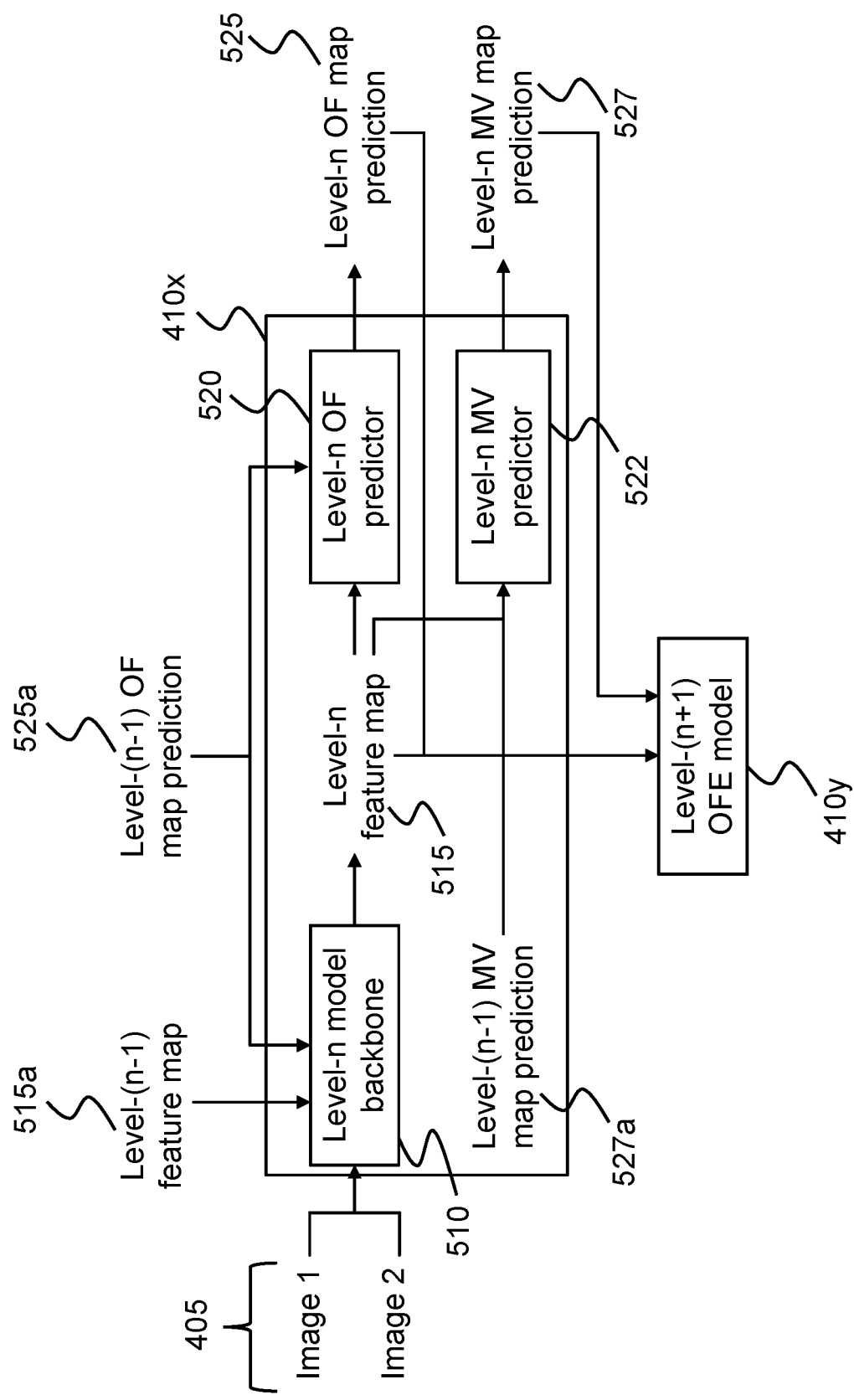
FIG. 5 illustrates one level of the optical flow estimation machine learning model of FIG. 4, in accordance with embodiments of the present disclosure.
Figure 6:
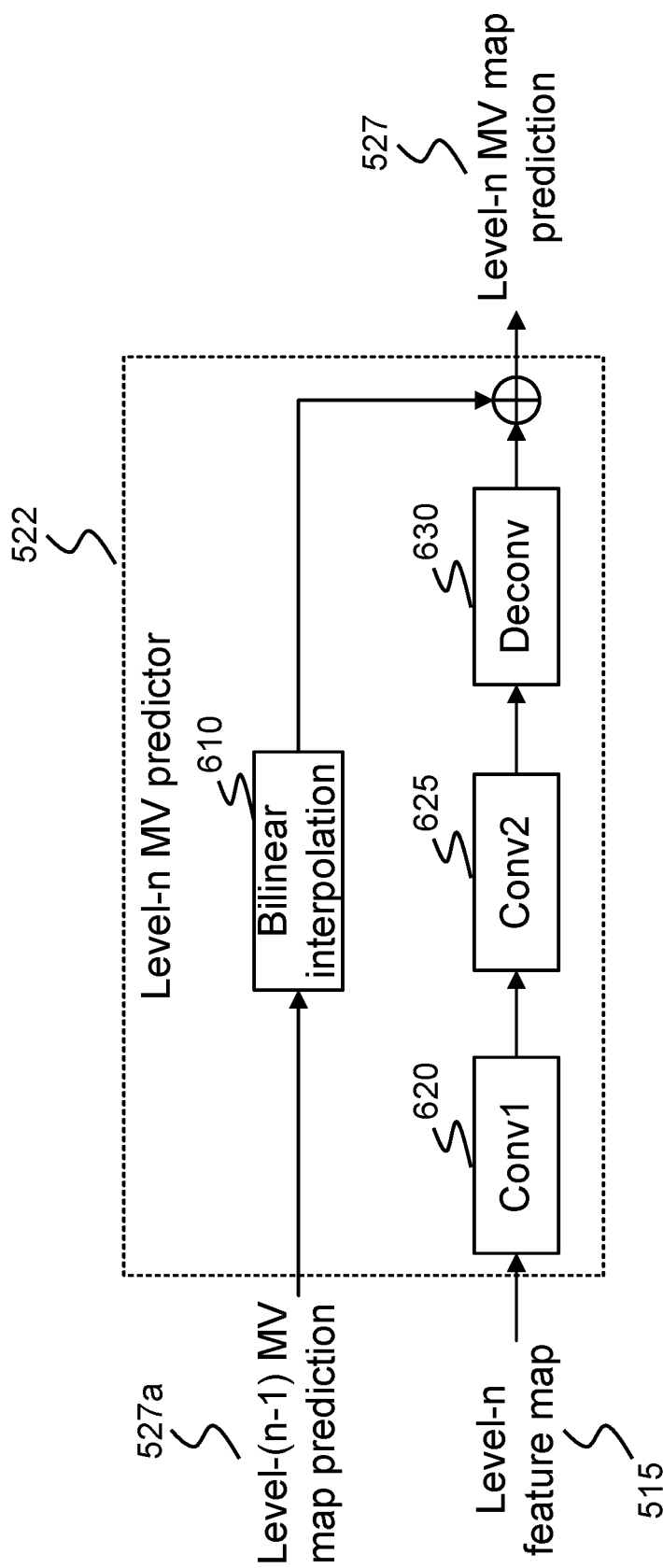
FIG. 6 illustrates a motion vector predictor component of FIG. 5, in accordance with embodiments of the present disclosure.

FIGS. 4 to 6 illustrate a machine learning model for OFE including the two-headed multi-level model architecture. FIG. 4 illustrates the overall two-headed multi-level OFE machine learning model 400 which includes a plurality of interdependent levels. FIG. 4 is similar to FIG. 2, but, in addition to providing an OF map prediction 415a to 415n, each level 410a to 410n of the OFE model 400 is further configured to provide an associated MV map prediction 417a to 417n. These MV map predictions can be fed to MV loss functions 427 to generate MV losses which are combined (e.g. added together) to determine a total MV loss 432, which may be used to update parameters of the model, for example via a gradient back-propagation operation or other machine learning process. As used herein, updating of parameters can refer to adjusting the parameters in general. Updating of parameters can refer to fine-tuning of the parameters. For example, when adapting a machine learning model at test time, previously learned model parameters can be more finely tuned.

Also shown in FIG. 4 are OF loss functions 425 which, similarly to FIG. 2, are used to compare the respective OF map predictions 415a to 415n to a ground-truth OF map 420 to generate OF losses which are also combined (e.g. added together) to determine a total OF loss 430. The OF loss functions 425 and the MV loss functions 427 can be used at different phases of model training or adaptation. For example, the OF loss functions can be unused during model adaptation, particularly when a ground-truth OF map is not available for the current image data. In some embodiment, during initial model training, both the OF loss functions and the MV loss functions may be used, as will be explained elsewhere herein. For example, the model parameters can be updated based on both the total OF loss and the total MV loss during at least some parts of initial model training. Here and elsewhere, the loss functions can be L1 or L2 loss functions, for example, as would be readily understood by a worker skilled in the art. L1 and L2 refer to different p-norms, for p=1 and p=2, as would be understood by a worker skilled in the art. In particular, a p-norm Lp applied to a vector x=(x$_1$, x$_2$, . . . , x$_n$) is computed via $$Lp = \left(\sum_{i=1}^{n} |x_i|^p\right)^{1/p}.$$

The loss function can be an Lp loss function in the sense that the loss is computed as the p-norm of a vector which is a difference between a vector output of the machine learning model and a vector indicative of a ground truth to which this vector output is to be compared.

In more detail with respect to FIG. 4, there are N interdependent levels of OFE model 410a to 410n. Each level of OFE model is configured to receive image data 405, for example indicative of a pair of images, and to generate a respective prediction 417a to 417n of an MV map for the image data. The image data can be provided as a pair of data arrays of size H×W×3, for example, which provides for each of a set of H×W pixels, three data points indicative of color and intensity for that pixel. The image data 405 may be obtained from a pair of images obtained from a video stream, and this pair of images may be immediately sequential in the video stream, or possibly non-immediately sequential, depending on the scenario. Each level 410a to 410n is further configured to generate a prediction 415a to 415n of an OF map for the image data. However the prediction of the OF map is not necessarily used in test time adaptation of the model, although it may be used in initial training of the model. Rather, as will be described elsewhere, machine learning model parameters within some or all of the levels may be updated, at least during test time adaptation, based on comparisons between the provided predictions of the MV map and a previously generated version of the MV map. This previously generated version of the MV map can be taken as the ground-truth MV map 422 associated with the image data 405, and can be obtained from a video stream. More particularly, the ground-truth MV map can be provided as part of the video stream containing the image data, in accordance with a video compression scheme used on the video stream.

For model adaptation, training, or both, the MV map predictions 417a to 417n from each level of the OFE model can be input to a respective MV loss function 427. Each MV loss function can be a substantially identical copy, or alternatively a single MV loss function can be used. It is also possible that different MV loss functions associated with different levels of the OFE model can differ in one or more respects. Each loss function compares the ground-truth MV map 422 with an MV map prediction 417a to 417n from a corresponding level of the OFE model, and outputs a loss value (e.g. a scalar) which generally increases with the difference between the ground-truth MV map and the MV map prediction. The losses output by each loss function can be added together (e.g. in a weighted or unweighted summation, possibly normalized) to generate a total MV loss 432. The parameters of the machine learning model can then be updated based on the total MV loss, or, more generally, based on the comparisons between the ground-truth MV map (which is the previously generated version of the MV map) and the MV map prediction. A machine learning parameter update component, which can perform operations such as machine learning back-propagation, can be used for this purpose, as will be readily understood by a worker skilled in the art.

FIGS. 5 and 6 illustrate details of components of FIG. 4. FIG. 5 illustrates the $n^{th}$ level 410x of the two-headed OFE model. Each of the N levels is similarly configured. As illustrated in FIG. 5, as compared to a given multi-level DNN-based OFE model for example as shown in FIG. 3, an extra module 522 is added for each level's model to predict the MV map. Compared to the baseline level-n model in FIG. 3, the architecture of FIG. 5 includes an extra stream for MV prediction. The level-n MV predictor 522 receives as input the level-n feature map 515 and the level-(n−1) MV map prediction 527a and uses these to generate a level-n MV map prediction 527. Furthermore, the level-n MV map prediction 527 will also be passed to the two-head level-(n+1) OFE model 410y for next level MV prediction.

In more detail with respect to FIG. 5, the model backbone 510 at the $n^{th}$ level (also referred to as a backbone portion) is configured to generate a corresponding level-n feature map 515. The level-n model backbone 510 receives as input the image data 405, the level-(n−1) feature map 515a output by the n−1$^{st}$ OFE model, and the OF map prediction 525a output by the n−1$^{st}$ OFE model. The level-n OF map prediction 525 of the optical flow map by the level-n OF predictor 520, as well as the prediction 527 of the level-n motion vector map by the level-n MV predictor 522, can be generated based at least in part on the level-n feature map 515. The operation of the level-n OF predictor 520 can be performed for example as described in the prior art. The operation of the level-n MV predictor 522 can be performed for example as described with respect to FIG. 6. The level-n MV predictor 522 can also receive as input the level-(n−1) MV map prediction 527a as output by the n−1$^{st}$ OFE model, while the level-n OF predictor 520 can receive as input the level (n−1) OF map prediction 525a as output by the n−1$^{st}$ OFE model. Modules that receive input can operate based on this input to produce output, in accordance with a machine learning (e.g. neural network) model which is trained and adapted.

In various embodiments, updating parameters of the machine learning model based at least in part on the comparison between the prediction of the motion vector map and the previously generated version of the motion vector map includes updating parameters of the backbone portion 510. That is, each level of model backbone can be updated based on the total loss determined by the loss functions. In model adaptation during a test phase, i.e. following initial training, the parameters of the level-n OF predictors 520 and the level-n MV predictors 522 can be kept fixed, while the parameters of the model backbones 510 can be updated based on the total loss, in accordance with a machine learning operation (such as a DNN training operation).

More generally, at different times corresponding to different phases of model training, model adaptation, or both, different parts of the model can be updated via machine learning, while other parts are held fixed. This provides for a selective, possibly iterative procedure in which different parts of the model are trained at different times.

FIG. 6 illustrates an implementation of the Level-n MV predictor 522 shown in FIG. 5, according to one embodiment. It should be understood that other implementations can also be used, for example by varying the number and configuration of convolution and deconvolution layers. According to FIG. 6, the Level-n MV predictor 522 receives as input the level-(n–1) MV map prediction 527a from the previous (n–1$^{st}$) level and the level-n feature map 515 as output by the level-n model backbone. The MV map prediction from the n–1$^{st}$ level is subject to a bilinear interpolation operator 610 so that resolution of this map can be increased. The bilinear interpolation operator can be viewed as a residual structure. In parallel, the level-n feature map 515 is processed using a pair of convolution operators 620, 625 coupled together in series, followed by a deconvolution operator 630. The outputs of the bilinear interpolation operator and the deconvolution operator are summed together (e.g. using a weighted or unweighted sum, possibly normalized) to produce the level-n MV map prediction 527 for the n$^{th}$ level. Parameters of the operators can be partially or fully configured using machine learning techniques, as would be readily understood by a worker skilled in the art.

In more detail with respect to FIG. 6, assume that the level-n feature map 515 and the level-(n–1) MV map prediction 527a are tensors of the size $H_{fn} \times W_{fn} \times C_{fn}$ and $H_{M_{n-1}} \times W_{M_{n-1}} \times 2$, respectively, and that the output, level-n MV map prediction 527 is a $H_{M_n} \times W_{M_n} \times 2$ tensor. The first two convolution layers 620, 625 will reduce the last dimension of the feature map from $C_{fn}$ to 2, and then the deconvolution layer 630 will resize the feature map to match the size of the output, i.e. $H_{M_n} \times W_{M_n} \times 2$. On the other stream, the level-(n–1) MV map prediction 527a is also resized to $H_{M_n} \times W_{M_n} \times 2$ using bilinear interpolation operator 610. Then the level-n MV map prediction 527 is obtained by adding together the output of the deconvolution layer 630 and the resized level-(n–1) MV map prediction as output by the bilinear interpolation operator 610.

By stacking the modified level-n OFE models 410x of FIG. 5 together, the two-head multi-level OFE model of FIG. 4 is obtained. Each level of the model has two outputs, namely a OF map prediction 525 and a MV map prediction 527.

According to embodiments of the present disclosure, a self-supervised learning task is performed in which MV map predictions are used to adapt the machine learning model for OF map prediction, for example at test time. As noted above, a video stream can include MV maps corresponding to image pairs, and these MV maps can be used as ground-truths for generating loss values via one or more MV loss functions. The loss values can be used to update parameters of the machine learning model. Such an adaptation can be performed at test time, for example following a prior training phase of the machine learning model, the prior training for example using a synthetic data set. For example, in the prior training phase, the machine learning model may be iteratively trained based at least in part on a series of comparisons, each comparison being between a prediction of the optical flow map for a respective instance of image training data and a provided ground-truth optical flow map associated with the respective instance of image training data. The prior training phase may involve training the machine learning model using a meta-learning process, as described elsewhere herein.

Trained OFE models are often used for estimating the OF maps of consecutive frame pairs to facilitate video understanding. While existing OFE models can only take two images as input, videos are often stored or provided in a compressed video stream format. As a result, portions of the video may need to be decoded into image frames before passing them to an OFE model. The upper portion of FIG. 7 (forward direction) illustrates the OFE process applied to a video stream, for one level of the OFE model of FIG. 4. The OFE process involves the video decoder 700 extracting the image data 405 (comprising a pair of images) from a video stream 702. The level-n model backbone 510 generates the level-n feature map 515 based on same. The level-n OF predictor 520 generates the level-n OF map prediction 525 based in part on the level-n feature map 515. Other levels can be operated similarly.

Figure 7:
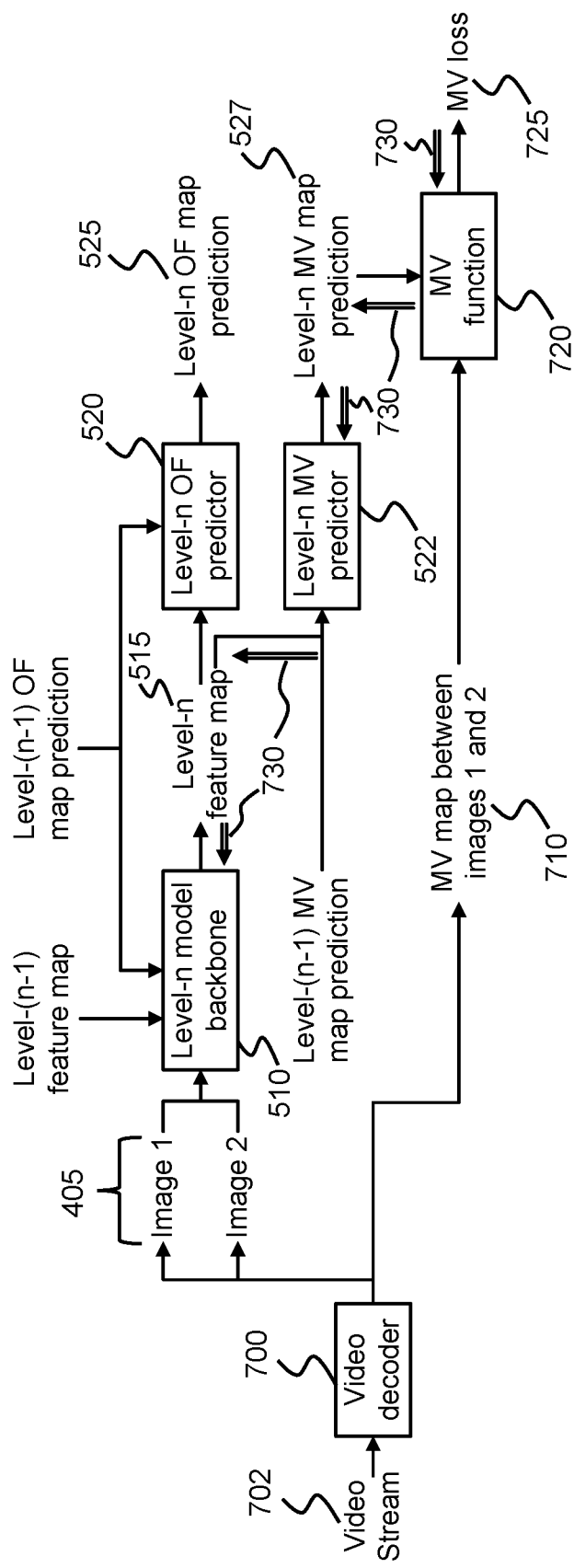
FIG. 7 illustrates adaptation of a machine learning model based on motion vector information obtained from a video stream, in accordance with embodiments of the present disclosure.

Furthermore, when a video stream is decoded, MV maps can be extracted (decoded) from the video stream. As previously discussed, MV maps are often used as part of the video compression process and can be previously generated by the device which encodes the video into the compressed video format. Taking the decoded MV maps as ground-truth, embodiments of the present disclosure provide for a MV loss function to calculate the MV prediction loss based on a comparison between the decoded MV maps and the MV map predictions obtained from the OFE model. FIG. 7 illustrates the ground-truth MV map 710 corresponding to the image data comprising a pair of images, being obtained from the video stream 702 by the video decoder 700. The video decoder provides the image data 405 to the OFE model as described above and provides the MV map 710 to a MV loss function 720. The level-n MV predictor 522 generates the level-n MV map prediction 527 based in part on the level-n feature map 515 from the level-n model backbone 510. The MV loss function 720 computes the corresponding MV loss 725 by performing a comparison between the prediction of the MV map as provided by the OFE model (e.g. as provided by the n$^{th}$ level of the OFE model) and the ground-truth MV map 710 as provided by the video decoder 700. The MV loss function 720 provides the computed MV loss back to the OFE model for updating parameters thereof.

By performing model adjustments (updates) which limit or minimize the MV prediction loss, the model can be adapted to the currently input image pair. For the model architecture in FIGS. 4 to 5, this can include adapting the model backbone 510 of each of a plurality of levels to adapt to the current input image pair. FIG. 7 also shows (with arrows 730) the gradient back-propagation flow for the level-n OFE model when training the level-n OFE model based on the MV prediction task. It can be seen that the gradient flow from the MV prediction task can effectively update the weights of the model backbone. More particularly, the MV loss value 725 as computed by the MV loss function 720 can be used to initiate a gradient back-propagation machine learning model parameter update operation (or other appropriate type of parameter update operation) which updates parameters of the level-n model backbone 510.

Using this approach on each level of the two-head multi-level architecture in FIG. 4, the total MV loss computed for an image pair at test time can be minimized so that the model backbone of every level can be updated at the same time. Because the ground-truth MV maps are, in various embodiments, relatively freely available from the compressed video stream, this MV prediction task is a self-supervised learning task and can be carried out during testing or inference time without extra annotations. That is, the MV maps are readily obtained from the compressed video stream because they are already a part thereof, and can be used for training purposes. Because MV prediction and OF prediction are similar tasks, it is recognized that training or adaptation of the OFE model based on MV losses can potentially improve OF prediction functionality.

In more detail, in an illustrative embodiment, assume that the ground-truth MV map $M^{gt}$ is a tensor of H×W×2, where H and W are the height and width of the input images, respectively, and that the predicted MV map $M^n$ of the level-n OFE model is a tensor of $H_{M_n} \times W_{M_n} \times 2$. The MV loss function for the level-n OFE model may be implemented by the following equation:

$$L_{M_n} = \sum_{x=1}^{W} \sum_{y=1}^{H} w(x, y) \|M^{gt}(x, y) - \sigma(M^n(x, y))\|_1.$$

Here, $\|\cdot\|_1$ means the $L_1$ norm operator and $\sigma(\cdot)$ is a bilinear interpolator to resize. Further, w(x,y) represents the weight for the pixel position (x,y). In some embodiments, weight 1.0 is assigned for the pixels which are inter-coded but weight 0.0 for those which are intra-coded. This is because intra-coded pixels do not have valid MVs assigned to them. Noting that a MV map may assign motion vectors to some pixels but not others, inter-coded pixels are those pixels to which motion vectors are assigned in the (e.g. ground-truth) MV map. Intra-coded pixels are those pixels to which motion vectors are not assigned in said MV map. Subsequently, the total MV loss is obtained via the computation $$L_M = \sum_{n=1}^{N} \rho^{N-n} L_{M_n},$$

where ρ=0.8, for example.

Figure 8:
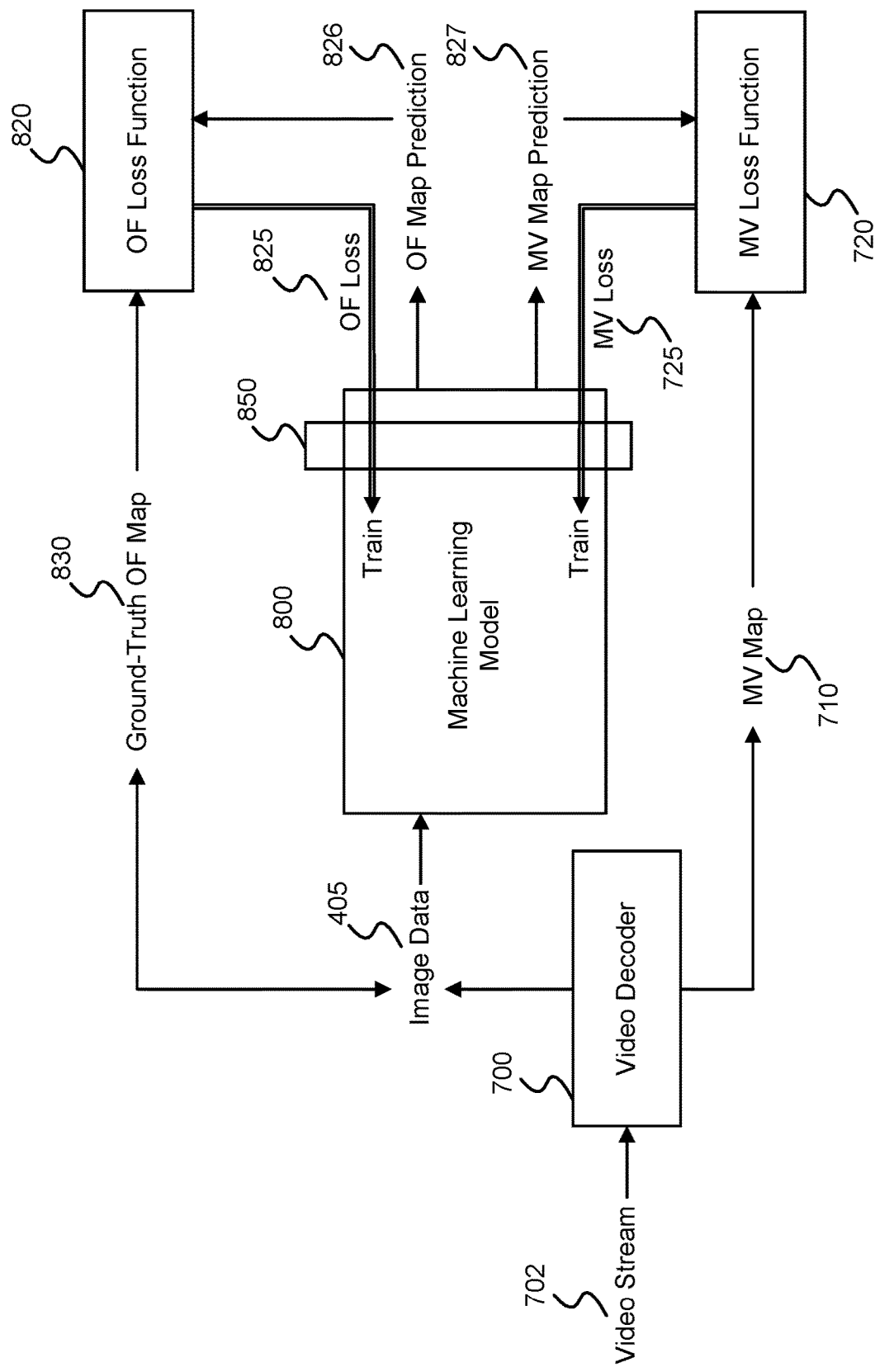
FIG. 8 illustrates adaptation of a machine learning model based on motion vector information obtained from a video stream, in accordance with other embodiments of the present disclosure.

FIG. 8 illustrates a generalized version of FIG. 7, according to other embodiments of the present disclosure. The machine learning model in particular is generalized to an arbitrary machine learning model capable of providing an OF map prediction and an MV map prediction. Notably, the machine learning model includes at least one fully or partially trained portion which is used directly or indirectly in both the generating of the prediction of the MV map and the generating of the prediction of the OF map. As stated previously, the OF map is indicative of a pattern of apparent motion indicated by sequential image frames in the video stream, and is similar to but not necessarily identical to the MV map. The fully or partially trained portion may be, for example, a portion such as the model backbone 510 which provides output (e.g. a feature map) which is input to both an MV map predictor and an OF map predictor. The fully or partially trained portion may be, for example, a portion which provides output (e.g. an OF map prediction) which is input to an OF map to MV map converter (See e.g. FIG. 10).

According to FIG. 8, and similarly to FIG. 7, a ground-truth MV map 710, corresponding to the image data comprising a pair of images, is obtained from a video stream 702 by a video decoder 700. The video decoder provides the image data 405 (image pair) to the machine learning model and provides the ground-truth MV map 710 to a MV loss function 720. The MV loss function 720 computes the corresponding MV loss 725 by performing a comparison between the MV map prediction 827 as provided by the machine learning model 800 and the ground-truth MV map 710 as provided by the video decoder 700. The MV loss function 720 provides the computed MV loss 725 back to the machine learning model 800 for updating parameters (e.g. training) thereof. Also shown is, although not necessarily present and possibly unused during test time adaptation, is an OF loss function 820. The OF loss function 820 computes the corresponding OF loss 825 by performing a comparison between the OF map prediction 826 as provided by the machine learning model 800 and a ground-truth OF map 830. The ground-truth OF map 830 corresponds to the image data 405 and is provided by some means, for example from a source of labelled training data. The OF loss function 820 provides the computed OF loss 825 back to the machine learning model 800 for updating parameter (e.g. training) thereof.

Also illustrated in FIG. 8 is a machine learning model manager 850. The machine learning model manager is responsible for management aspects such as training or adapting the machine learning model, e.g. by updating parameters (weights) thereof. The machine learning model manager can be incorporated with one or more of the loss functions, or with the machine learning model itself. Various parameter update operations, learning processes, switching between training, adaptation and inference modes, etc. can be performed by the machine learning model manager. The machine learning model manager is not illustrated in other embodiments for the sake of clarity.

Accordingly, during an inference or model adaptation phase, a test-time adaptation process may be applied. The input to the test-time adaptation process includes a pair of decoded image frames $\{I^1, I^2\}$ as well as the corresponding decoded MV map M, both obtained for example from a video stream. The total MV loss of the trained model is calculated and used to and update the model weights by limiting or minimizing the total MV loss for K steps. Subsequently, the OF map prediction may be given by the updated model. This test-time adaptation process can help the model, learned from a training data distribution, adapt to the test image pair which may come from a significantly different distribution.

In some embodiments, a meta-learning process is also implemented. The meta-learning process may be implemented by a machine learning model manager, for example. The meta-learning process may tend to cause the model to be configured in such a manner that the test-time adaptation process is particularly effective. An embodiment of the meta-learning process is described for the model of FIGS. 4 and 5 as follows. This embodiment can be readily adapted to other models. Denote the total OF loss determined for an OF map prediction (e.g. total OF loss 430 in FIG. 4) by $L_F$, the weights of the model backbones 510 of all levels collectively by $\theta^B$, the weights of OF predictors 510 of all levels collectively by $\theta^F$, and the weights of MV predictors 522 of all levels collectively by $\theta^M$. The two-head multi-level OFE model is pre-trained by jointly optimizing the total loss given by $L_F+L_M$. Then the model is initialized by the pre-trained weights: $\theta_{pre}^B$, $\theta_{pre}^F$ and $\theta_{pre}^M$. These weights are the parameters of the model. Subsequently, the model weights are further optimized using the meta-learning as described below in Process 1. Specifically, Line 8-13 of Process 1 simulate the model weights being updated by the self-supervised MV prediction task as already described above. Line 14 of Process 1 evaluates the OF prediction loss based on the updated weights. By minimizing this loss during the training phase, the model is influenced to converge to a point where the test-time performance will improve after the model is updated by the MV prediction task. The test-time adaptation process can thus be performed subsequently to the meta-learning process. In fact, the test-time adaptation process and the meta-learning process are complementary.

---

Process 1: Meta-learning process of the two-head multi-level OFE model

1 Input: A training dataset. Each training sample consists of a pair of images $\{I^1, I^2\}$, a ground-truth OF $F^{gt}$, and a ground-truth MV map $M^{gt}$
2 Input: Number of iterations for inner update: K; Learning rates: $\alpha$, $\beta$
3 Output: meta-learned model parameters: $\theta = \{\theta^B, \theta^F, \theta^M\}$
4 Initialize the model with pre-trained weights: $\theta \leftarrow \{\theta_{pre}^B, \theta_{pre}^F, \theta_{pre}^M\}$
5 while not converged do
6   | Sample a batch of training samples $(I_s^1, I_s^2, F_s^{gt}, M_s^{gt})_{s=1}^S$;
7   | for each s do
8   | | Copy model weights: $\bar{\theta}_s^B \leftarrow \theta^B, \bar{\theta}_s^F \leftarrow \theta^F$
9   | | for k = 1: K do
10   | | | Evaluate the total MV loss $L_M(I_s^1, I_s^2, M_s^{gt}; \bar{\theta}_s^B, \theta^M)$;
11   | | | Update parameters with gradient descent:
12   | | | $\bar{\theta}_s^B \leftarrow \bar{\theta}_s^B - \alpha \nabla_{\bar{\theta}_s^B} L_M, \theta^M \leftarrow \theta^M - \alpha \nabla_{\theta^M} L_M$;

13   | | end
14   | | Evaluate the total OF loss $L_F(I_s^1, I_s^2, F_s^{gt}; \bar{\theta}_s^B, \bar{\theta}_s^F)$;
15   | | Calculate the gradients $\nabla_{\bar{\theta}_s^B} L_F$ and $\nabla_{\bar{\theta}_s^F} L_F$;
16   | end
17   | Update meta-model parameters:
18   | $\theta^B \leftarrow \theta^B - \sum_{k=1}^S \nabla_{\bar{\theta}_s^B} L_F, \theta^F \leftarrow \theta^F - \sum_{k=1}^S \nabla_{\bar{\theta}_s^F} L_F$;
19 end

---

Figure 9:
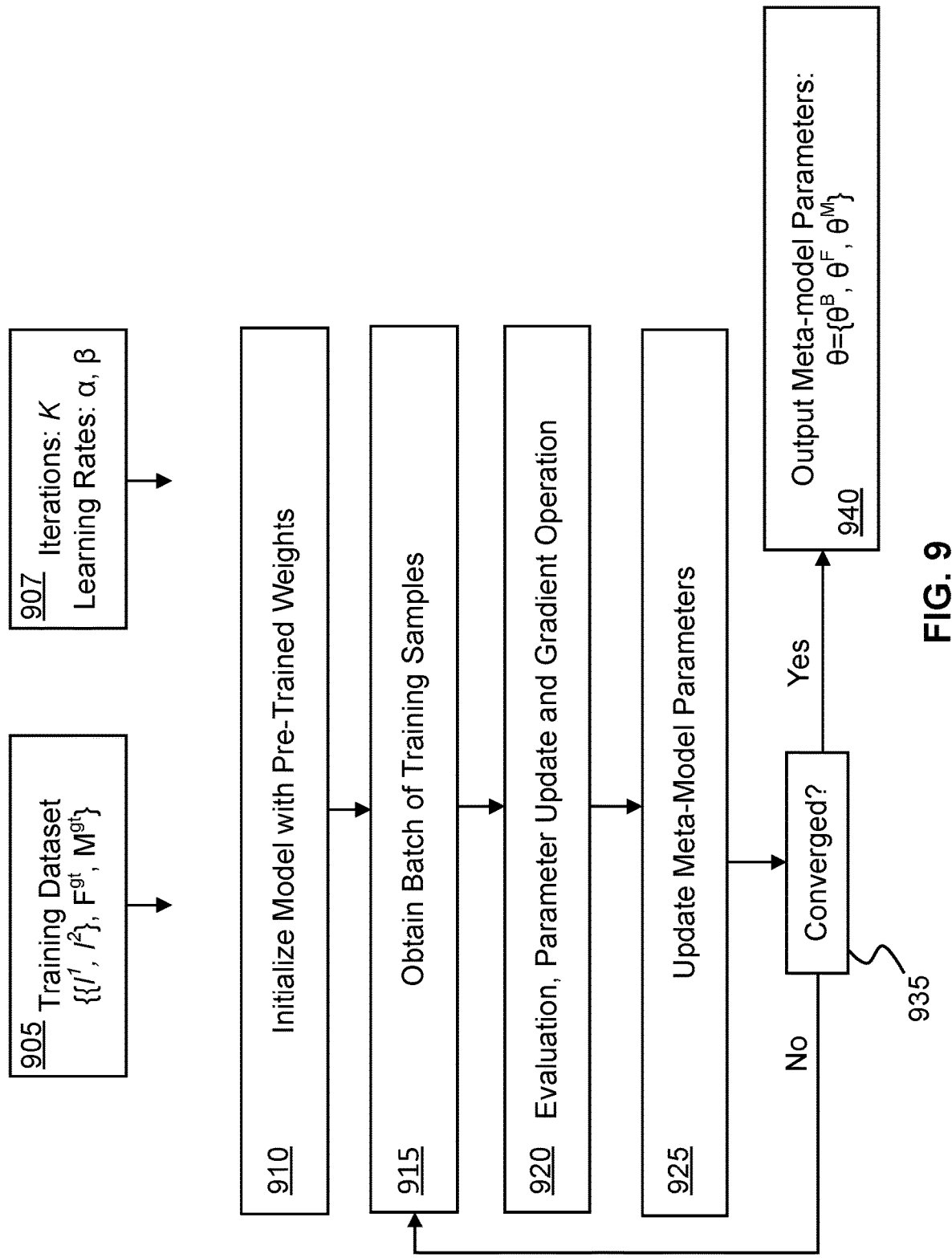
FIG. 9 illustrates aspects of a meta-learning process for training a machine learning model using annotated training data, in accordance with embodiments of the present disclosure.

Aspects of Process 1 are illustrated in FIG. 9. The inputs on line 1 of Process 1 are shown as inputs 905 and the inputs on line 2 of Process 1 are shown as inputs 907. The output defined at line 3 of Process 1 and partially provided at line 18 are shown as output 940. As per line 4 of Process 1, the model is initialized 910 with pre-trained weights. Then, as per line 6 of Process 1, a batch of training samples is sampled (obtained) 915. Then, for each training sample in the batch, an evaluation, parameter update and gradient operation 920 is performed. This operation 920 corresponds to lines 8 to 15 of Process 1. Then, the meta-model parameters are updated 925, corresponding to lines 17-18 of Process 1. Then, a convergence condition is checked 935, for example to determine if the meta-model parameters have substantially converged to a steady state. If not, the process starting at operation 915 is repeated with another batch of training samples. Otherwise, the meta-model parameters are output 940 and the meta-learning process is ended.

Accordingly, in some embodiments, the meta-learning process used to train the machine learning model includes iteratively updating parameters of the machine learning model based on comparisons of: motion vector map predictions with ground-truth motion vector maps; and optical flow map predictions with ground-truth optical flow maps. In some further embodiments, this parameter updating includes multiple operations which are referred to as gradient descent operations. A first gradient descent operation may be performed for updating a first set of parameters, being parameters of one or more backbone portions of the machine learning model. As noted above, each backbone portion may be configured to generate a respective feature map, based upon which OF map predictions and MV map predictions can be made. A second gradient descent operation may be performed for updating a second set of parameters, being parameters of one or more motion vector map prediction portions of the machine learning model. The motion vector map prediction portions are each configured to generate a respective motion vector map prediction based at least in part on one or more of the feature maps. A third gradient descent operation may be performed for updating a third set of parameters, being parameters of one or more optical flow map prediction portions of the machine learning model. The optical flow map prediction portions are each configured to generate a respective optical map prediction based at least in part on one or more of the feature maps. Some embodiments of the present disclosure pertain to performance of the meta-learning process on its own, potentially but not necessarily followed by the test-time adaptation process.

In some embodiments, the gradients involved in Process 1 are derived from two different sources. The first source is the MV prediction loss $L_M$, and the other source is the optical flow prediction loss $L_F$. The gradients from $L_M$ include $$\nabla_{\bar{\theta}_s^B} L_M$$

for the first set of parameters, and $\nabla_{\theta^M} L_M$ for the second set of parameters. These gradients are used in the internal K iterations (starting at line 9 of Process 1) for updating the first and second sets of parameters, respectively. After the K iterations, the gradients from $L_F$ are estimated based on the updated parameters. The gradients from $L_F$ also include two parts:

$$\nabla_{\bar{\theta}_s^B} L_F$$

for the first set of parameters, and $$\nabla_{\bar{\theta}_s^F} L_F$$

for the third set or parameters. Then the first set of parameters are reset to the values they had before the K iterations, and the first set of parameters are then updated by the sum of the gradients from $L_F$, i.e. $\sum_{s=1}^{S} \nabla_{\hat{\theta}_s^B} L_F$.

Notably, gradients corresponding to two different tasks, i.e. the OF prediction (primary) task and the MV prediction (secondary) task, are used in Process 1. In other words, at least one of the three sets of parameters is updated based at least in part on computed gradients with respect to the first loss $L_M$, and also at least one of the three sets of parameters is updated based at least in part on a computed gradients with respect to the second loss $L_F$. In particular, at line 12 of Process 1, $\theta^M$ is updated based on $\nabla_{\theta^M} L_M$, while at line 18 of Process 1, $\theta^B$ is updated based on $$\nabla_{\hat{\theta}_s^B} L_F$$

and $\theta^F$ is updated based on $$\nabla_{\hat{\theta}_s^F} L_F.$$

At least this aspect distinguishes Process 1 from conventional MAML processes. As will be readily understood, a gradient of a multi-variable function refers to a vector whose components are partial derivatives of the function. This vector denotes the direction that will cause the most increase of the function value.

It is also noted that Process 1 involves the use of placeholder parameters $\hat{\theta}_s^B$ and $\hat{\theta}_s^F$, which are used temporarily in place of the first and second sets of parameters, respectively, during a repeated gradient descent update process. After such use and after updating of all the sets of parameters in one iteration of the process, the placeholder parameters are discarded.

Embodiments of the present disclosure, as described above, are developed upon the multi-level network architecture, which is popular among state-of-the-art DNN-based OFE models. The specific design of the model backbone and the OF predictor are abstracted for each level's OFE model, making the two-head multi-level network architecture applicable to a variety of OFE architectures.

Embodiments of the present disclosure, as described above, may potentially mitigate the distribution shift problem by introducing a self-supervised learning task, i.e. MV prediction, and employing a test-time adaptation inference process. Due to the high cost of collecting ground-truth OF maps for natural videos, state-of-the-art DNN-based OFE models are trained based on synthetic data plus very limited natural videos for which such ground-truth OF maps are available. Accordingly, in the prior art, directly applying the learned model to the test data may result in significant performance drop. By adapting to test data itself, embodiments of the present disclosure are expected to potentially achieve higher prediction accuracy. Further, during inference, the ground-truth annotation information is not available. Accordingly, in embodiments of the present disclosure may implement the MV prediction task, whose label, the MV map, may be readily available from compressed video streams. The MV prediction task is used to adapt the model in the test-time. Moreover, the MV prediction task is very similar to the primary OF prediction task. Optimizing the model towards better MV prediction may potentially cause the model backbone to extract more precise motion features, leading to better OF prediction as well.

Third, in order to facilitate convergence of the test-time adaptation process, a meta-learning process may be used for training the model. By simulating the test-time adaptation process in an inner loop, the model explicitly learns its weights to a point from which the test-time adaptation process may potentially optimize the model for a better OF map prediction for the current input.

Figure 10:
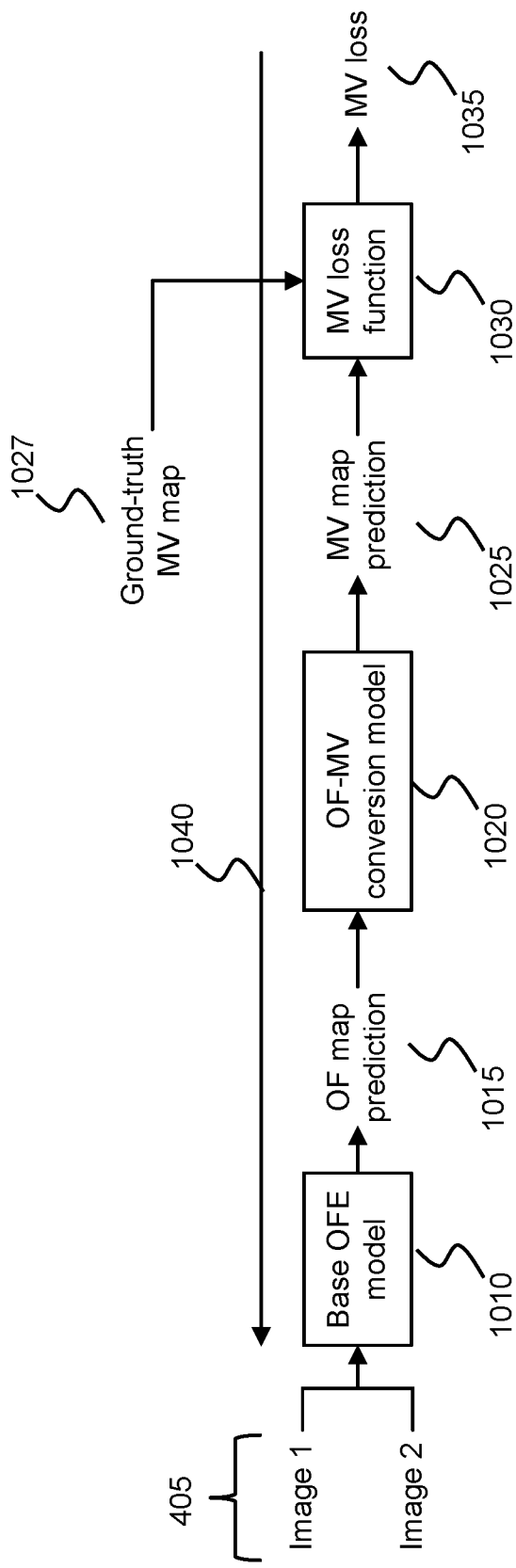
FIG. 10 illustrates an optical flow estimation machine learning model in accordance with other embodiments of the present disclosure.

An alternative to the multi-level OFE model of FIGS. 4 and 5 is not presented. Embodiments of the present disclosure can pertain to this alternative. This alternative embodiment may also conceptually use the same self-supervised learning task, meta-learning process, and self-adaptation process, as described above. However, the alternative embodiment involves a different design for the MV prediction stream, which has no assumption on the network architecture of the base OFE model. Rather, the only requirement for the base OFE model is that it needs to be trainable through gradient back-propagation. The architecture of this embodiment is shown in FIG. 10. A base OFE model 1010 receives image data 405, such as an image pair, and generates an OF map prediction 1015 based at least in part on the image data. An OF-to-MV conversion model 1020 receives the OF map prediction from the base OFE model and generates an MV map prediction 1025 based at least in part on the OF map prediction. The base OFE model and the OF-to-MV conversion model, coupled together, comprise the machine learning model to be trained. The OF map prediction 1015 can also be provided to external components, such as a module which requires same for operation, an OF loss function, or a combination thereof.

Figure 11:
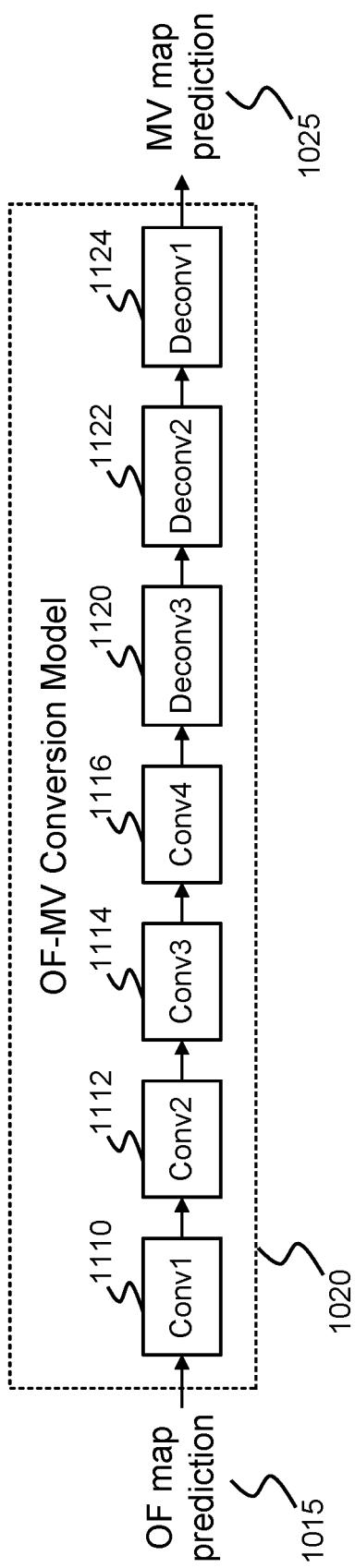
FIG. 11 illustrates an optical flow to motion vector conversion model portion of the machine learning model of FIG. 10, in accordance with embodiments of the present disclosure.

The OF-to-MV conversion model is configured to convert the OF map prediction, as output by the base OFE model, to a MV map. Then, the base OFE model can be adapted by the back-propagated gradient as indicated by the arrows 1040 in FIG. 10. An example implementation of the OF-to-MV conversion model 1020 is illustrated in FIG. 11. The model in FIG. 11 employs four convolution layers 1110, 1112, 1114, 1116 and three deconvolution layers 1120, 1122, 1124 coupled together in series to convert the received H×W×2 OF map prediction 1015 to a H×W×2 MV map prediction 1025. As shown in FIG. 10, the implementation of the MV loss function 1030 is the same as previously described herein for example with respect to FIGS. 4, 7 and 8, where only a single level is present. The MV loss function 1030 compares the MV map prediction 1025 with a ground-truth MV map 1027 to generate an MV loss 1035. In some embodiments and phases, the ground-truth MV map 1027 can be obtained from a video decoder which also provides the image data 405, as described previously.

Accordingly, in some embodiments, the machine learning model can include an optical flow map estimation portion (e.g. the base OFE model 1010) configured to generate the prediction of the OF map, as well as a conversion portion (e.g. the OF-to-MV conversion model 1020) configured to generate a prediction of the MV map based on the prediction of the OF map as output by the optical flow map estimation portion. Furthermore, updating parameters the machine learning model can include updating parameters of the optical flow map estimation portion. This may be done during some phases, such as a test adaptation phase, while keeping parameters of the conversion portion fixed. At an earlier training time, for example based on fully annotated training data including ground-truth OF maps, the conversion portion can be trained, for example while keeping parameters of the optical flow map estimation portion fixed.

Parameter updates (e.g. weight updates) can be performed in accordance with machine learning techniques such as neural network training techniques.

The above-described alternative embodiment removes the multi-level assumption for the architecture of the base OFE model and is applicable to a variety of DNN-based OFE models.

Figure 12:
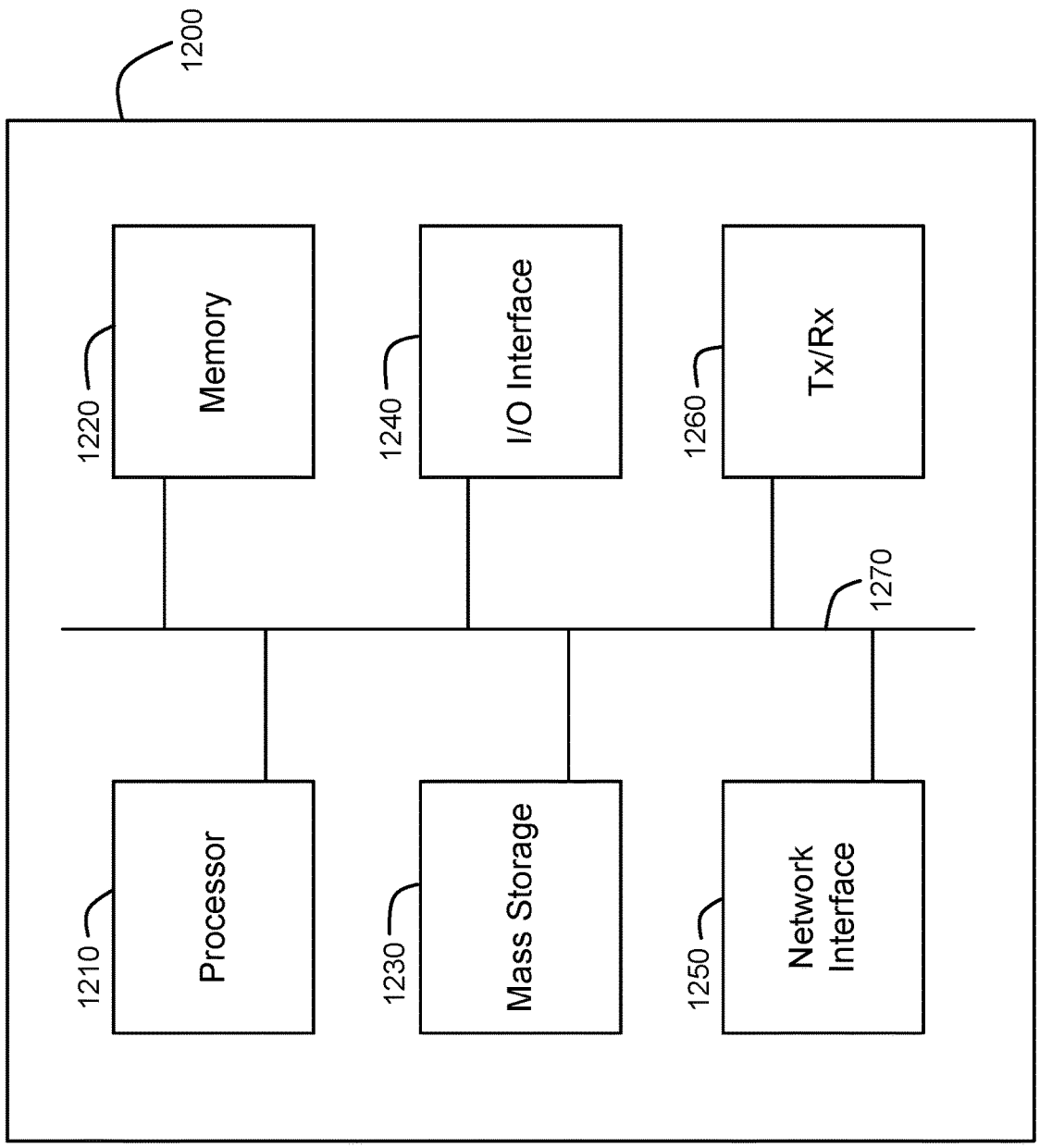
FIG. 12 is a schematic diagram of an electronic device, according to embodiments of the present disclosure.

FIG. 12 is a schematic diagram of an electronic device 1200 that may perform any or all of the steps of the above methods and features described herein, according to different embodiments of the present disclosure. In particular, FIG. 12 illustrates a computing device which can be used to perform machine learning operations, store and operate the machine learning model, store and operate the machine learning model manager, store and operate the video decoder, store and operate the loss functions, or a combination thereof. Multiple such computing devices may be provided, coupled and operated together, each for a respective purpose as described herein. For example, end-user computers, smartphones, IoT devices, laptops, tablet personal computers, electronic book readers, gaming machine, media players, devices performing tasks in relation to generation of 2D or 3D images, physical machines or servers, or other computing devices can be configured as the electronic device. An apparatus configured to perform embodiments of the present disclosure can include one or more electronic devices for example as described in FIG. 12, or portions thereof.

As shown, the device includes a processor 1210, such as a Central Processing Unit (CPU) or specialized processors such as a Graphics Processing Unit (GPU) or other such processor unit, memory 1220, non-transitory mass storage 1230, I/O interface 1240, network interface 1250, and a transceiver 1260, all of which are communicatively coupled via bi-directional bus 1270. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method steps described above.

An electronic device configured in accordance with the present disclosure may comprise hardware, software, firmware, or a combination thereof. Examples of hardware are computer processors, signal processors, ASICs, FPGAs, silicon photonic chips, etc. The hardware can be electronic hardware, photonic hardware, or a combination thereof. The electronic device can be considered a computer in the sense that it performs operations that correspond to computations, e.g. receiving and processing signals indicative of image data, implementing a machine learning model such as a neural network model, updating parameters (weights) of the machine learning model, providing outputs such as MV map predictions and OF map predictions, etc. The video decoder can extract image data and MV maps from a video stream, which may be provided as a signal or obtained from computer memory. A loss function can obtain a prediction and compare it with a ground-truth via one or more signal processing or computation hardware or software elements. A machine learning model manager may be responsible for operating the machine learning model, for example by updating parameters thereof during an adaptation phase, by implementing a MAML operation, implementing a training operation, etc. The electronic device can thus be provided using a variety of technologies as would be readily understood by a worker skilled in the art.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device. The computer-readable medium may be non-transitory in the sense that the information is not contained in transitory, propagating signals.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the disclosure are examples and can be varied in many ways. Such present or future variations are not to be regarded as a departure from the spirit and scope of the disclosure, and all such modifications as would be obvious to one skilled in the art are intended to be included within the scope of the following claims.

What is claimed is:

1. A method for adapting a machine learning model for optical flow map prediction, comprising:
   training, using a meta-learning process, the machine learning model by iteratively updating parameters of the machine learning model based on comparisons of:
      motion vector map predictions with ground-truth motion vector maps; and
      optical flow map predictions with ground-truth optical flow maps, the updating of the parameters of the machine language model including:
         a first gradient descent operation for updating a first set of parameters, being parameters of one or more backbone portions of the machine learning model, the one or more backbone portions each configured to generate a respective feature map;
         a second gradient descent operation for updating a second set of parameters, being parameters of one or more motion vector map prediction portions of the machine learning model, the motion vector map prediction portions each configured to generate a respective motion vector map prediction based at least in part on one or more of the feature maps; and
         a third gradient descent operation for updating a third set of parameters, being parameters of one or more optical flow map prediction portions of the machine learning model, the optical flow map prediction portions each configured to generate a respective optical map prediction based at least in part on one or more of the feature maps;
   obtaining image data describing a pair of image frames from a video stream;
   generating, using the machine learning model, a prediction of a motion vector map for the image data, the motion vector map indicative of motion indicated by the pair of image frames;
   obtaining, from information encoded into the video stream, a previously generated version of the motion vector map for the image data, the previously generated version of the motion vector map being provided as part of the video stream in accordance with a video compression scheme used on the video stream; and
   updating the parameters of the machine learning model based at least in part on a comparison between the prediction of the motion vector map and the previously generated version of the motion vector map, said comparison of motion vector map predictions with ground-truth motion vector maps being encoded as a first loss $L_M$, said comparison of optical flow map predictions with ground-truth optical flow maps being encoded as a second loss $L_F$;
   for each of one or more training samples, performing a set of operations comprising:
      setting a first set of placeholder parameters $\tilde{\theta}_s^B$ to be equal to the first set of parameters $\theta^B$;
      setting a second set of placeholder parameters $\tilde{\theta}_s^F$ to be equal to the second set of parameters $\theta^F$;
      repeatedly performing for a predetermined number K of iterations:
         evaluating the first loss $L_M$;
         updating the first set of placeholder parameters according to a gradient descent update step involving a gradient $$\nabla_{\tilde{\theta}_s^B} L_M$$

of the first loss $L_M$ with respect to the first set of placeholder parameters;
         updating the second set of parameters according to another gradient descent update step involving a gradient $\nabla_{\theta^M} L_M$ of the first loss $L_M$ with respect to the third set of parameters $\theta^M$;
      following said K iterations:
         evaluating the second loss value $L_F$; and
         computing a first gradient $$\nabla_{\tilde{\theta}_s^B} L_F$$

for the training sample and a second gradient $$\nabla_{\tilde{\theta}_s^F} L_F$$

for the training sample, the first gradient being a gradient of the total optical flow loss value with respect to the first set of placeholder parameters, the second gradient being a gradient of the total optical flow loss with respect to the second set of placeholder parameters;
   wherein the machine learning model is used directly or indirectly in both the generating of the prediction of the motion vector map and generating of a prediction of an optical flow map, the optical flow map indicative of a pattern of apparent motion indicated by sequential image frames in the video stream.

2. The method of claim 1, wherein the machine learning model is a multi-level machine learning model, the method further comprising:
   generating, using a plurality of interdependent levels of the multi-level machine learning model, a plurality of respective predictions of the motion vector map for the image data; and
   updating machine learning model parameters within some or all of the plurality of levels based at least in part on one or more comparisons, each of the one or more comparisons being between a respective one of the plurality of predictions of the motion vector map and the previously generated version of the motion vector map.

3. The method of claim 1, further comprising generating, using the machine learning model, the prediction of the optical flow map for the image data or for further image data.

4. The method of claim 1, wherein the one or more backbone portions configured to generate a feature map based upon which both the prediction of the optical flow map and the prediction of the motion vector map are generated, and wherein said updating parameters of the machine learning model based at least in part on a comparison between the prediction of the motion vector map and the previously generated version of the motion vector map comprises updating parameters of the one or more backbone portions.

5. The method of claim 1, wherein the machine learning model comprises:
   an optical flow map estimation portion configured to generate the prediction of the optical flow map; and a conversion portion configured to generate the prediction of the motion vector map based on the prediction of the optical flow map as output by the optical flow map estimation portion, and wherein updating parameters the machine learning model comprises updating parameters of the optical flow map estimation portion.

6. The method of claim 1, further comprising, after performing the set of operations for all of the training samples:
updating the first set of parameters $\theta^B$ according to a first overall gradient descent update step involving a sum, over all of the training samples, of the first gradients $$\nabla_{\tilde{\theta}_s^B} L_F;$$

and
updating the third set of parameters OF according to a second overall gradient descent update step involving a sum, over all of the training samples, of the second gradients $$\nabla_{\tilde{\theta}_s^F} L_F.$$

7. An electronic device comprising one or more processing components configured to:
train, using a meta-learning process, a machine learning model by iteratively updating parameters of the machine learning model based on comparisons of:
motion vector map predictions with ground-truth motion vector maps; and
optical flow map predictions with ground-truth optical flow maps, the updating of the parameters of the machine language model including:
a first gradient descent operation for updating a first set of parameters, being parameters of one or more backbone portions of the machine learning model, the one or more backbone portions each configured to generate a respective feature map;
a second gradient descent operation for updating a second set of parameters, being parameters of one or more motion vector map prediction portions of the machine learning model, the motion vector map prediction portions each configured to generate a respective motion vector map prediction based at least in part on one or more of the feature maps; and
a third gradient descent operation for updating a third set of parameters, being parameters of one or more optical flow map prediction portions of the machine learning model, the optical flow map prediction portions each configured to generate a respective optical map prediction based at least in part on one or more of the feature maps;
obtain, by the machine learning model, image data describing a pair of image frames from a video stream;
generate, using the machine learning model component, a prediction of a motion vector map for the image data, the motion vector map indicative of motion indicated by the pair of image frames;
obtain, by a motion vector loss function, from information encoded into the video stream, a previously generated version of the motion vector map for the image data, the previously generated version of the motion vector map being provided as part of the video stream in accordance with a video compression scheme used on the video stream; and
update, by a machine learning model manager, parameters of the machine learning model based at least in part on a comparison between the prediction of the motion vector map and the previously generated version of the motion vector map, said comparison of motion vector map predictions with ground-truth motion vector maps being encoded as a first loss $L_M$, said comparison of optical flow map predictions with ground-truth optical flow maps being encoded as a second loss LE;
perform, for each of one or more training samples, a set of operations comprising:
setting a first set of placeholder parameters $\tilde{\theta}_s^B$ to be equal to the first set of parameters $\theta^B$;
setting a second set of placeholder parameters $\tilde{\theta}_s^F$ to be equal to the second set of parameters $\theta^F$;
repeatedly performing for a predetermined number K of iterations by:
evaluating the first loss $L_M$;
updating the first set of placeholder parameters according to a gradient descent update step involving a gradient $$\nabla_{\tilde{\theta}_s^B} L_M$$

of the first loss $L_M$ with respect to the first set of placeholder parameters:
updating the second set of parameters according to another gradient descent update step involving a gradient $\nabla_{\theta^M} L_M$ of the first loss $L_M$ with respect to the third set of parameters $\theta^M$;
following said K iterations by:
evaluating the second loss value $L_F$; and
computing a first gradient $$\nabla_{\tilde{\theta}_s^B} L_F$$

for the training sample and a second gradient $$\nabla_{\tilde{\theta}_s^F} L_F$$

for the training sample, we first gradient being a gradient of the total optical flow loss value with respect to the first set of placeholder parameters, the second gradient being a gradient of the total optical flow loss with respect to the second set of placeholder parameters;
wherein the machine learning model is used directly or indirectly in both the generating of the prediction of the motion vector map and generating of a prediction of an optical flow map, the optical flow map indicative of a pattern of apparent motion indicated by sequential image frames in the video stream.

8. The apparatus of claim 7, wherein the machine learning model is a multi-level machine learning model, the apparatus further configured to:
generate, using a plurality of interdependent levels of the multi-level machine learning model, a plurality of respective predictions of the motion vector map for the image data; and update, by the machine learning model manager, machine learning model parameters within some or all of the plurality of levels based at least in part on one or more comparisons, each of the one or more comparisons being between a respective one of the plurality of predictions of the motion vector map and the previously generated version of the motion vector map.

9. The apparatus of claim 7, further configured to generate, using the machine learning model, the prediction of the optical flow map for the image data or for further image data.

10. The apparatus of claim 7, wherein the one or more backbone portions configured to generate a feature map based upon which both the prediction of the optical flow map and the prediction of the motion vector map are generated, and wherein the machine learning model parameter is configured to perform said updating parameters of the machine learning model based at least in part on a comparison between the prediction of the motion vector map and the previously generated version of the motion vector map at least in part by updating parameters of the one or more backbone portions.

11. The apparatus of claim 7, wherein the machine learning model comprises:
an optical flow map estimation portion configured to generate the prediction of the optical flow map; and
a conversion portion configured to generate the prediction of the motion vector map based on the prediction of the optical flow map as output by the optical flow map estimation portion, and wherein updating parameters the machine learning model comprises updating parameters of the optical flow map estimation portion.

12. The apparatus of claim 7, wherein the apparatus is configured to, after performing the set of operations for all of the training samples:
update the first set of parameters $\theta^B$ according to a first overall gradient descent update step involving a sum, over all of the training samples, of the first gradients $$\nabla_{\theta_s^B} L_F;$$

and update the third set of parameters $\theta^F$ according to a second overall gradient descent update step involving a sum, over all of the training samples, of the second gradients $$\nabla_{\theta_s^F} L_F.$$

* * * * *

UNITED STATES PATENT AND TRADEMARK OFFICE
CERTIFICATE OF CORRECTION

| | |
|---|---|
| PATENT NO. | : 12,354,284 B2 |
| APPLICATION NO. | : 17/524480 |
| DATED | : July 8, 2025 |
| INVENTOR(S) | : Wentao Liu et al. |

It is certified that error appears in the above-identified patent and that said Letters Patent is hereby corrected as shown below:

In the Specification

In the description:
Column 15, Line 39, "12 ||| $\tilde{\theta}_s^B \leq \tilde{\theta}_s^B - \alpha \nabla_{\tilde{\theta}_s^B} L_M, \theta^M \leftarrow \theta^M - \alpha \nabla_{\theta^M} L_M;$" should read -- 12 ||| $\tilde{\theta}_S^B \leftarrow \tilde{\theta}_S^B - \alpha \nabla_{\tilde{\theta}_S^B} L_M, \theta^M \leftarrow \theta^M - \alpha \nabla_{\theta^M} L_M;$ --;

Column 16, Line 64, "for the third set or parameters. Then the first set of param-" should read -- for the third set of parameters. Then the first set of param --;

In the Claims

Column 23, Line 19, "updating the third set of parameters OF according to a" should read -- updating the third set of parameters $\theta^F$ according to a --;
Column 23, Line 60, "generate, using the machine learning model component, a" should read -- generate, using the machine learning model, a --;
Column 24, Line 12, "flow maps being encoded as a second loss LE;" should read -- flow maps being encoded as a second loss $L_F$ --;
Column 24, Line 49, "for the training sample, we first gradient being a" should read -- for the training sample, the first gradient being a --.

Signed and Sealed this
Twenty-first Day of October, 2025

John A. Squires
*Director of the United States Patent and Trademark Office*